(12) United States Patent
Hashimoto et al.

(10) Patent No.: US 7,966,044 B2
(45) Date of Patent: Jun. 21, 2011

(54) COMPUTER-READABLE MEDIUM STORING DISPLAY CONTROL PROGRAM AND MOBILE TERMINAL

(75) Inventors: Fumiyuki Hashimoto, Kawasaki (JP);
Yoshiyuki Okada, Kawasaki (JP);
Yoshiaki Kageyama, Inagi (JP);
Shinobu Tamura, Inagi (JP); Rumiko Matsuda, Kawasaki (JP); Koji Sato, Kawasaki (JP); Shigenori Sasaki, Kawasaki (JP)

(73) Assignees: Fujitsu Limited, Kawasaki (JP); Fujitsu Frontech Limited, Tokyo (JP)

( * ) Notice: Subject to any disclaimer, the term of this patent is extended or adjusted under 35 U.S.C. 154(b) by 640 days.

(21) Appl. No.: 12/071,285

(22) Filed: Feb. 19, 2008

(65) Prior Publication Data

US 2008/0214239 A1 Sep. 4, 2008

(30) Foreign Application Priority Data

Feb. 23, 2007 (JP) ................................. 2007-044496

(51) Int. Cl.
*H04B 1/38* (2006.01)
(52) U.S. Cl. ....... 455/566; 455/41.3; 455/420; 455/557; 345/1.1; 345/2.1; 345/2.3; 348/14.07; 348/333.01
(58) Field of Classification Search .................. 455/11.1, 455/41.1–41.3, 66.1, 418–420, 550.1, 556.1, 455/556.2, 557, 566, 3.06; 345/2.1, 2.2, 345/2.3, 156, 169, 1.1; 348/14.01–14.05, 348/14.07, 14.08, 211.1, 211.2, 333.01; 381/306
See application file for complete search history.

(56) References Cited

U.S. PATENT DOCUMENTS

| | | | |
|---|---|---|---|
| 6,489,934 B1 * | 12/2002 | Klausner | 345/1.1 |
| 7,012,610 B2 * | 3/2006 | Turner et al. | 345/519 |
| 7,657,227 B2 * | 2/2010 | Doan et al. | 455/41.3 |
| 2003/0177444 A1 | 9/2003 | Sunata | |
| 2005/0041859 A1 | 2/2005 | Nguyen et al. | |
| 2005/0259032 A1 * | 11/2005 | Morris | 345/1.1 |

(Continued)

FOREIGN PATENT DOCUMENTS

JP 10-039981 2/1998

(Continued)

OTHER PUBLICATIONS

Patent Abstracts of Japan, Publication No. 2005-071350, published Mar. 17, 2005.

(Continued)

*Primary Examiner* — Anthony S Addy
(74) *Attorney, Agent, or Firm* — Staas & Halsey LLP

(57) ABSTRACT

A medium storing a program for display control. When the program is executed by a computer realized in a mobile terminal, the mobile terminal operates as follows. An area-information storing unit stores information on a first display area of an external display device and a second display area of a built-in display. A screen-data production unit acquires content to be displayed, and produces screen data corresponding to the first display area. An entire-image display unit divides the screen data into partial areas each corresponding to the second display area, adds to the entire screen data area-display data indicating the extent of each partial area and a corresponding identifier, and displays the screen data on the external display device. On receipt of an identifier, a partial-image display unit extracts a portion of the screen data for a partial area corresponding to the identifier, and displays the portion on the built-in display.

18 Claims, 21 Drawing Sheets

U.S. PATENT DOCUMENTS

| | | | |
|---|---|---|---|
| 2006/0079214 A1* | 4/2006 | Mertama et al. | 455/414.1 |
| 2007/0271525 A1* | 11/2007 | Han et al. | 715/786 |
| 2008/0108392 A1* | 5/2008 | Moon et al. | 455/566 |
| 2009/0143107 A1* | 6/2009 | Hotta | 455/566 |

FOREIGN PATENT DOCUMENTS

| | | |
|---|---|---|
| JP | 2002-175135 | 6/2002 |
| JP | 2002-335172 | 11/2002 |
| JP | 2003-273971 | 9/2003 |
| JP | 2005-71350 | 3/2005 |

OTHER PUBLICATIONS

Patent Abstracts of Japan, Publication No. 2003-273971, published Sep. 26, 2003.

Patent Abstracts of Japan, Publication No. 2002-335172, published Nov. 22, 2002.

Patent Abstracts of Japan, Publication No. 2002-175135, published Jun. 21, 2002.

Japanese Office Action dated Dec. 21, 2010 in application No. 2007-044496.

* cited by examiner

|  |  |  |
|---|---|---|
| (11)<br>Login<br>Customer Number<br>[____]<br>Secret Identification Code<br>[____]<br>[Login] | (12)<br>... Bank<br>Online Banking<br><br>★★★★★Information★★★★★<br><br>System Maintenance<br>From 21:00 Sunday Until 7:00<br>Following Morning | (13) |
| (21)<br>Choose Service<br><br>*New Registration*<br><br>*Change Registration* | (22)<br>Service is unavailable during the above interval.<br><br>Details of Service<br><br>★★★★★★★★★★★★★★★ | (23) |
| (31)<br>Notice<br><br>*Management of Secret Identification Code*<br><br>*Caution against Financial Crime* | (32)<br>Call Us<br><br>Weekday<br>0120-XXX-XXX<br><br>Holiday<br>0120-XXX-YYY | (33)<br>Frequently Asked Questions<br><br>*About Operations*<br><br>*About Products* |

FIG. 12

| AREA IDENTIFICATION TABLE ||||| 
|---|---|---|---|---|
| DEVICE NAME | ELECTRONIC PAPER A ||||
| IDENTIFIER | UPPER-LEFT CORNER | UPPER-RIGHT CORNER | LOWER-RIGHT CORNER | LOWER-LEFT CORNER |
| 1 | 0, 0 | 239, 0 | 239, 399 | 0, 399 |
| 2 | 240, 0 | 479, 0 | 479, 399 | 240, 399 |
| 3 | 480, 0 | 719, 0 | 719, 399 | 480, 399 |
| 4 | 0, 400 | 239, 400 | 239, 799 | 0, 799 |
| 5 | 240, 400 | 479, 400 | 479, 799 | 240, 799 |
| 6 | 480, 400 | 719, 400 | 719, 799 | 480, 799 |
| 7 | 0, 800 | 239, 800 | 239, 1119 | 0, 1119 |
| 8 | 240, 800 | 479, 800 | 479, 1119 | 240, 1119 |
| 9 | 480, 800 | 719, 800 | 719, 1119 | 480, 1119 |

Frequently Asked Questions

*About Operations*

*About Products*

FIG. 21

COMPUTER-READABLE MEDIUM STORING DISPLAY CONTROL PROGRAM AND MOBILE TERMINAL

CROSS-REFERENCE TO RELATED APPLICATIONS

This application is based upon and claims the benefits of priority from the prior Japanese Patent Application No. 2007-044496 filed on Feb. 23, 2007, the entire contents of which are incorporated herein by reference.

BACKGROUND OF THE INVENTION

1. Field of the Invention

The present invention relates to a computer-readable medium storing a display control program and a mobile terminal using the display control program, where the display control program controls information displayed on both of a built-in display and an external display device.

2. Description of the Related Art

Recently, the technology of manufacturing display devices (which display characters and images) has dramatically advanced, and various types of display devices have been developed. For example, the recently developed display devices include a type which realizes a high frame rate and is suitable for display of dynamic images, a type which has a large display area and realizes high resolution, a lightweight portable type, and a nonvolatile type which maintains the displayed image even after being powered off. Such display devices of various types are being properly used according to the purpose.

Incidentally, the portable display devices such as mobile phones, PDAs (personal digital assistants), laptop computers, and the like have a compact, lightweight built-in display for realizing the portability. When content is required to be displayed in a large display area or to the view of people other than the user of each portable display device, the portable display devices may be connected to an external display device. In this case, the user operates the portable display device to select a content item and display the selected content item on both of the built-in display and the external display device. In addition, the user can further operate the portable display device to display another content item associated with the currently displayed content item.

However, in the case where the display area of the built-in display is smaller than the display area of the external display device, the convenience of operation of the display screen deteriorates. That is, when screen data is produced so as to fit the display area of the external display device, it is impossible to display on the built-in display the produced screen data as they are. Therefore, the built-in display can display only a reduced image or a portion of the produced screen data. In the case where the built-in display displays the reduced image of the produced screen data, the size of displayed characters is reduced, so that it is difficult to identify with the naked eye an item to be operated. On the other hand, in the case where the built-in display displays only a portion of the produced screen data, it is necessary to scroll the screen of the built-in display so that an item to be operated is displayed within the screen of the built-in display, since only the items displayed within the screen can be operated in most of the conventional portable display devices.

Further, according to a known technique as disclosed, for example, in Japanese Unexamined Patent Publication No. 10-039981, a code is assigned in advance to each of items which can be operated, and each item can be operated by simply inputting the code assigned to the item. For example, a number is assigned in advance to each hyperlink in an HTML (HyperText Markup Language) document. When a number is inputted, displayed information is switched by tracing a hyperlink corresponding to the inputted number. When this technique is used, it is possible to perform a screen operation at the sight of the screen of an external display device irrespectively of the information displayed on the built-in display at that time, and therefore reduce the burden of the operation imposed on the user.

However, the above technique disclosed in Japanese Unexamined Patent Publication No. 10-039981 has a drawback that operation errors by the user are likely to occur. This is because the portion of the portable display device through which the operational input is done is located apart from the external display device on which the item to be operated can be confirmed. In order to prevent the operation errors by the user, it is preferable that the user can perform the operation at the sight of the built-in display, which is located near the portion of the portable display device through which the operational input is done.

SUMMARY OF THE INVENTION

The present invention is made in view of the above problems, and the first object of the present invention is to provide a computer-readable medium storing a display control program for a mobile terminal, where the display control program assists a user of the mobile terminal so that the user can precisely and easily perform a screen operation of the mobile terminal even when the display area of a built-in display of the mobile terminal is smaller than the display area of an external display device.

In addition, the second object of the present invention is to provide a mobile terminal controlled by a display control program which assists a user of the mobile terminal so that the user can precisely and easily perform a screen operation of the mobile terminal even when the display area of a built-in display of the mobile terminal is smaller than the display area of an external display device.

In order to accomplish the first object, according to the first aspect of the present invention, a computer-readable medium storing a display control program to be executed by a computer realized in a mobile terminal is provided for controlling information displayed on a built-in display built in the mobile terminal and an external display device which can be connected to the mobile terminal through a connection unit built in the mobile terminal and has a first display area greater than a second display area which the built-in display has. When the display control program is executed by the computer, the display control program realizes in the mobile terminal: an area-information storing unit which stores information on the first display area of the external display device and the second display area of the built-in display; a screen-data production unit which acquires a content item to be displayed, and produces screen data corresponding to the first display area of the external display device by reference to the area-information storing unit; an entire-image display unit which divides the screen data produced by the screen-data production unit, into a plurality of portions to be displayed in a plurality of partial areas of the first display area each corresponding to the second display area, by reference to the area-information storing unit, adds area-display data to the screen data, and displays the screen data on the external display device, where the area-display data indicates a correspondence between the extent of each of the plurality of partial areas and an identifier for identifying the partial area; and a partial-image display unit which extracts from the screen data produced by the screen-data production unit one of the plurality of portions of the screen data for one of the plurality of partial areas corresponding to an identifier, and displays the one of the plurality of portions of the screen data on the built-in display, when the identifier is received through an input unit which is built in the mobile terminal.

In addition, in order to accomplish the second object, according to the second aspect of the present invention, a mobile terminal is provided. The mobile terminal includes: an input unit which receives input of information into the mobile terminal; a built-in display which is built in the mobile terminal and has a second display area; a connection unit which is built in the mobile terminal and through which the mobile terminal can be connected to an external display device having a first display area greater than the second display area; an area-information storing unit which stores information on the second display area of the external display device and the first display area of the built-in display; a screen-data production unit which acquires a content item to be displayed, and produces screen data corresponding to the second display area of the external display device by reference to the area-information storing unit; an entire-image display unit which divides the screen data produced by the screen-data production unit, into a plurality of portions to be displayed in a plurality of partial areas of the second display area each corresponding to the first display area, by reference to the area-information storing unit, adds area-display data to the screen data, and displays the screen data on the external display device, where the area-display data indicates a correspondence between an extent of each of the plurality of partial areas and an identifier for identifying the partial area; and a partial-image display unit which extracts from the screen data produced by the screen-data production unit one of the plurality of portions of the screen data for one of the plurality of partial areas corresponding to an identifier, and displays the one of the plurality of portions of the screen data on the built-in display, when the identifier is received through the input unit.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIG. 12 is a diagram illustrating a second exemplary screen displayed on the electronic-paper display according to the first embodiment.

FIG. 13 is a diagram illustrating a second example of the data structure of the area identification table.

FIG. 21 is a diagram illustrating an exemplary screen displayed on an electronic-paper display according to the third embodiment.

DESCRIPTION OF EMBODIMENTS

Embodiments of the present invention will be described below with reference to the accompanying drawings, wherein like reference numbers refer to like elements throughout. First, an outline of the present invention which is realized in the embodiments is indicated, and thereafter details of the embodiments are explained.

Figure 1:
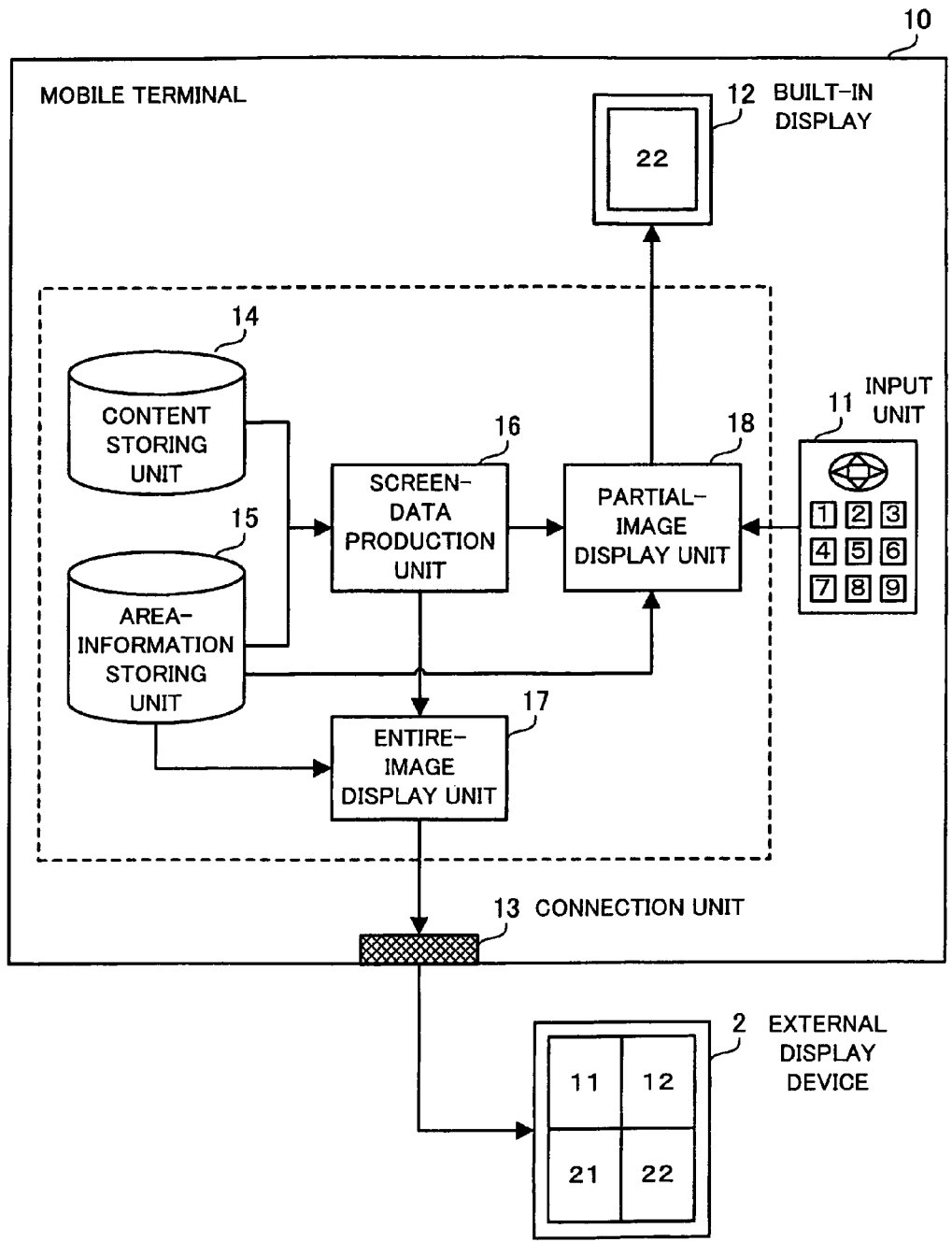
FIG. 1 is a diagram illustrating an outline of the present invention.

A mobile terminal 10 illustrated in FIG. 1 includes an input unit 11, a built-in display 12, a connection unit 13, a content storing unit 14, an area-information storing unit 15, a screen-data production unit 16, an entire-image display unit 17, and a partial-image display unit 18. In addition, the mobile terminal 10 is connected to an external display device 2, which has a display area greater than the built-in display 12.

The input unit 11 is an input device which receives manual input from a user. The input unit 11 has input keys assigned to numbers and scroll keys assigned to the upward, downward, rightward, and leftward directions. When the user presses one of the keys, the input unit 11 inputs a signal indicating the pressed key into the partial-image display unit 18.

The built-in display 12 is a display device which is built in the mobile terminal 10, and is, for example, a compact, lightweight liquid-crystal display device. When the built-in display 12 receives screen data from the partial-image display unit 18, the built-in display 12 displays the screen data until the built-in display 12 receives the next screen data.

The connection unit 13 is an interface for exchanging data with an external device. When the connection unit 13 receives screen data from the entire-image display unit 17 while the external display device 2 is connected to the connection unit 13, the connection unit 13 outputs the received screen data to the external display device 2. It is sufficient that the connection unit 13 is an interface which enables communication with the external display device 2. The manner of connection with the external display device 2 is not specifically limited, and may be, for example, a cable or wireless connection.

The content storing unit 14 stores files of content items to be displayed, and the content items may be, for example, HTML documents, still images, and the like. The mobile terminal 10 stores in advance the files of content items to be displayed, in the content storing unit 14 in response to manual input by the user.

The area-information storing unit 15 stores information on the display areas of the built-in display 12 and the external display device 2. Specifically, information indicating the numbers of pixels arrayed in the horizontal and vertical directions in the display area of each of the built-in display 12 and the external display device 2 is stored in the area-information storing unit 15. When a plurality of external display devices can be connected to the connection unit 13, the area-information storing unit 15 stores information on the display areas of the plurality of external display devices.

The screen-data production unit 16 acquires from the content storing unit 14 one of the files of content items to be displayed, and produces screen data corresponding to the display area of the external display device 2 by reference to the area-information storing unit 15. Thus, the produced screen data has the size corresponding to the numbers of pixels arrayed in the horizontal and vertical directions in the display area of the external display device 2.

The entire-image display unit 17 acquires from the screen-data production unit 16 the screen data produced by the screen-data production unit 16, and divides the acquired screen data into a plurality of portions to be displayed in a plurality of partial areas each corresponding to the display area of the built-in display 12, by reference to the area-information storing unit 15. For example, in the case where the display area of the external display device 2 is four times greater than the display area of the built-in display 12, the entire-image display unit 17 divides the acquired screen data into four portions to be displayed in four partial areas.

In addition, the entire-image display unit 17 adds area-display data to the entire screen data, where the area-display data indicates a correspondence between the range of each partial area and an identifier for identifying the partial area. For example, the correspondence is indicated by attaching to each partial area a coordinate set indicating the relative position of the partial area. Thereafter, the entire-image display unit 17 outputs the divided screen data to the connection unit 13, so that the external display device 2 displays a screen in which the identifiers identifying the plurality of partial areas are indicated in the corresponding partial areas, respectively.

When a signal indicating one of the identifiers indicated by the external display device 2 is inputted through the input unit 11, the partial-image display unit 18 acquires the screen data produced by the screen-data production unit 16. Then, the partial-image display unit 18 extracts screen data for the partial area corresponding to the inputted identifier, and outputs the extracted screen data to the built-in display 12.

Assume that the display area of the external display device 2 is four times greater than the display area of the built-in display 12, and the entire-image display unit 17 divides the screen data produced by the screen-data production unit 16 into four portions to be displayed in four partial areas (upper-left, upper-right, lower-left, and lower-right areas) to which the identifiers "11," "12," "21," and "22" are assigned, respectively. In this case, when the user operates the input unit 11 at the sight of the screen of the external display device 2, and inputs the identifier "22," the built-in display 12 displays the image displayed in the lower-right area of the screen of the external display device 2.

In the mobile terminal 10 constructed as above, first, the screen-data production unit 16 produces screen data corresponding to the display area of the external display device 2 connected to the connection unit 13. Next, the entire-image display unit 17 divides the screen data produced by the screen-data production unit 16, into a plurality of portions to be displayed in a plurality of partial areas each corresponding to the display area of the built-in display 12, and adds the area-display data to the entire screen data, where the area-display data indicates the correspondence between the range of each partial area and an identifier for identifying the partial area. Then, the divided screen data is displayed on the external display device 2. Thereafter, when an identifier is inputted through the input unit 11, the partial-image display unit 18 extracts from the screen data the portion displayed in the partial area corresponding to the inputted identifier, so that the extracted portion of the screen data is displayed on the built-in display 12.

As explained above, even with no scroll operation by the user, the user can make the built-in display 12 instantly display a portion of the screen data which includes an item to be operated. Thereafter, the user can operate the mobile terminal 10 at the sight of the screen of the built-in display 12. Therefore, it is possible to positively reduce the operation errors.

Figure 2:
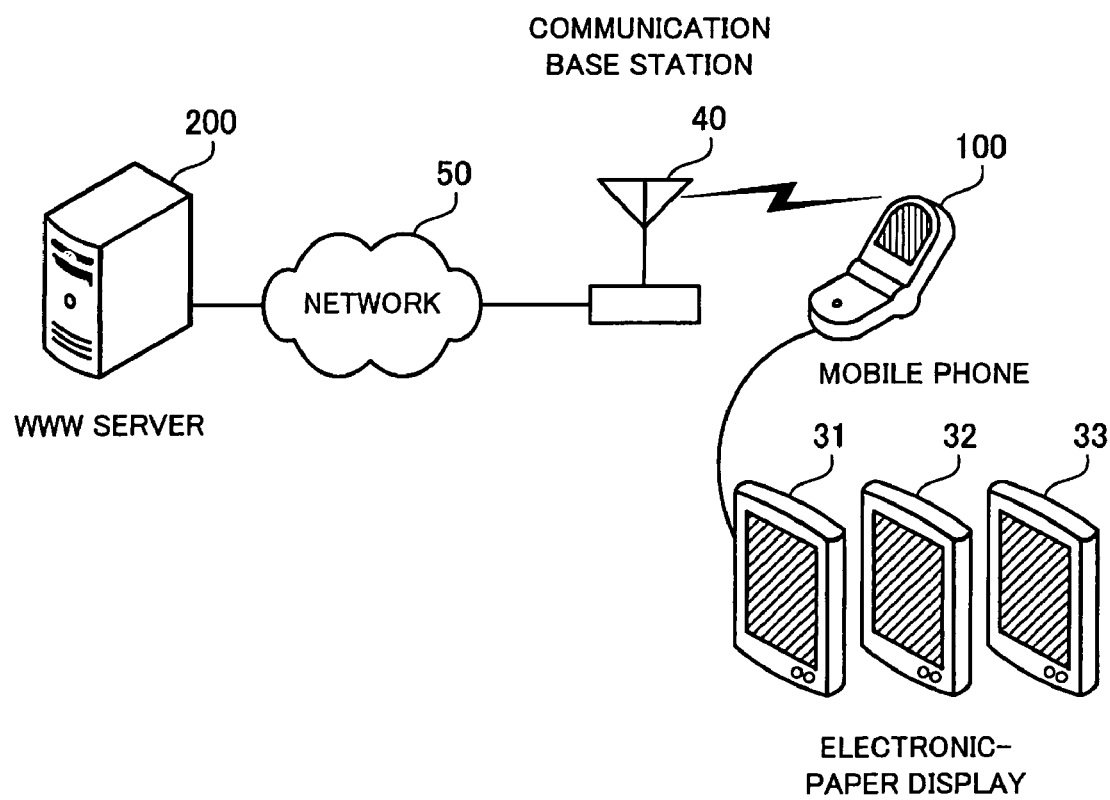
FIG. 2 is a diagram illustrating an example of a configuration of a content delivery system according to a first embodiment of the present invention.

FIG. 2 is a diagram illustrating an example of a configuration of a content delivery system according to a first embodiment of the present invention. The content delivery system according to the first embodiment enables each mobile phone to acquire a content item from a WWW server through a network and display the content item on an electronic-paper display connected to the mobile phone. The content delivery system of FIG. 2 is constituted by a mobile phone 100, a WWW server 200, electronic-paper displays 31, 32, and 33, a communication base station 40, and a network 50. The WWW server 200 and the communication base station 40 are connected to the network 50, and can communicate with each other. In addition, the communication base station 40 and the mobile phone 100 can wirelessly communicate with each other. Further, the mobile phone 100 can be connected to one of the electronic-paper displays 31, 32, and 33 through a communication cable.

The electronic-paper displays 31, 32, and 33 are nonvolatile display devices, in which displayed images are maintained even after the power is turned off. The electronic-paper displays 31, 32, and 33 are respectively different types having different display areas. When image data is inputted from the mobile phone 100 into one of the electronic-paper displays 31, 32, and 33, the electronic-paper display displays the image of the image data on the display area of the electronic-paper display, and maintains the image until the next image data is inputted. However, since the frame rates of the electronic-paper displays are relatively low, the electronic-paper displays are not suitable for display of dynamic images.

The mobile phone 100 has an input unit, a compact display unit, and an antenna for wireless communication. The mobile phone 100 also has the processing functions of a computer which can execute any programs. For example, the mobile phone 100 can acquire a content item such as an HTML document or an image from the WWW server 200 through the communication base station 40 and the network 50, and display the acquired content item. Further, the mobile phone 100 can acquire a program from the WWW server 200, and execute the acquired program.

The WWW server 200 is a server computer which stores and delivers files of content items and programs. When a file-acquisition request is inputted into the WWW server 200 through the network 50, the WWW server 200 sends a file designated by the file-acquisition request, to the source of the file-acquisition request.

Hereinbelow, a procedure performed by the user of the mobile phone 100 for displaying a content item on the electronic-paper displays 31, 32, and 33 is explained. First, the user operates the mobile phone 100 so that the mobile phone 100 acquires from the WWW server 200 a program for display control of the electronic-paper displays 31, 32, and 33 (i.e., a display control program for the electronic-paper displays 31, 32, and 33). Next, the user further operates the mobile phone 100 so as to execute the display control program, and designates the address of a content item to be displayed. Then, the mobile phone 100 acquires from the WWW server 200 the content item corresponding to the designated address, and displays the acquired content item on the electronic-paper display connected to the mobile phone 100.

Figure 3:
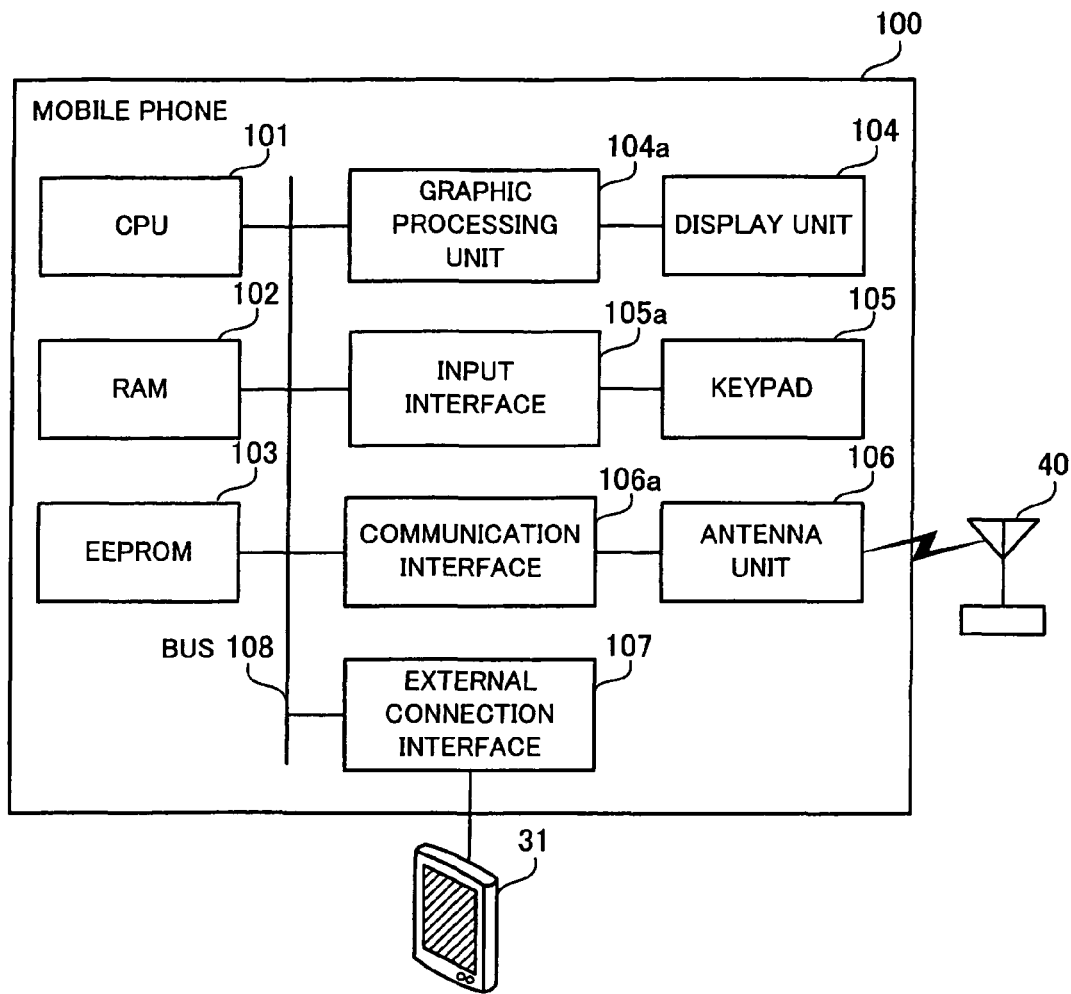
FIG. 3 is a diagram illustrating an example of a hardware construction of a mobile phone.

FIG. 3 is a diagram illustrating an example of a hardware construction of the mobile phone. The entire mobile phone 100 is controlled by a CPU (Central Processing Unit) 101, to which a RAM (Random Access Memory) 102, an EEPROM (Electronically Erasable and Programmable Read Only Memory) 103, a graphic processing unit 104a, an input interface 105a, a communication interface 106a, and an external connection interface 107 are connected through a bus 108. The RAM 102 temporarily stores at least portions of an OS (Operating System) program and application programs which are executed by the CPU 101, as well as various types of data necessary for processing by the CPU 101. The EEPROM 103 is a rewritable, nonvolatile semiconductor memory such as a flash memory, and stores the OS program, the application programs, and various data which should be saved.

A display unit (built-in display) 104 is connected to the graphic processing unit 104a, which makes the display unit 104 display an image on a screen in accordance with an instruction from the CPU 101. The display unit 104 is a display device which has a sufficiently high frame rate, and can instantly display on the screen information in which a manual input by the user is reflected.

In addition, a keypad 105 is connected to the input interface 105a. The keypad 105 is an input device which includes input keys assigned to numbers and alphabetical characters, scroll keys assigned to the upward, downward, rightward, and leftward directions, a confirmation key for confirming processing to be performed, and other keys. The input interface 105a transmits signals sent from the keypad 105, to the CPU 101 through the bus 108. The communication interface 106a is connected to the antenna unit 106, which is provided for searching for a communication base station 40 located within the reach of radio signals and wirelessly communicating with the communication base station. The communication interface 106a exchanges data with other computers through the antenna unit 106. The external connection interface 107 is an interface which is provided for exchanging data with other devices through a communication cable. The external connection interface 107 transfers data to a device connected to the external connection interface 107 (e.g., the electronic-paper display 31) in accordance with an instruction from the CPU 101, and transfers to the CPU 101 data received from the device connected to the external connection interface 107.

Figure 4:
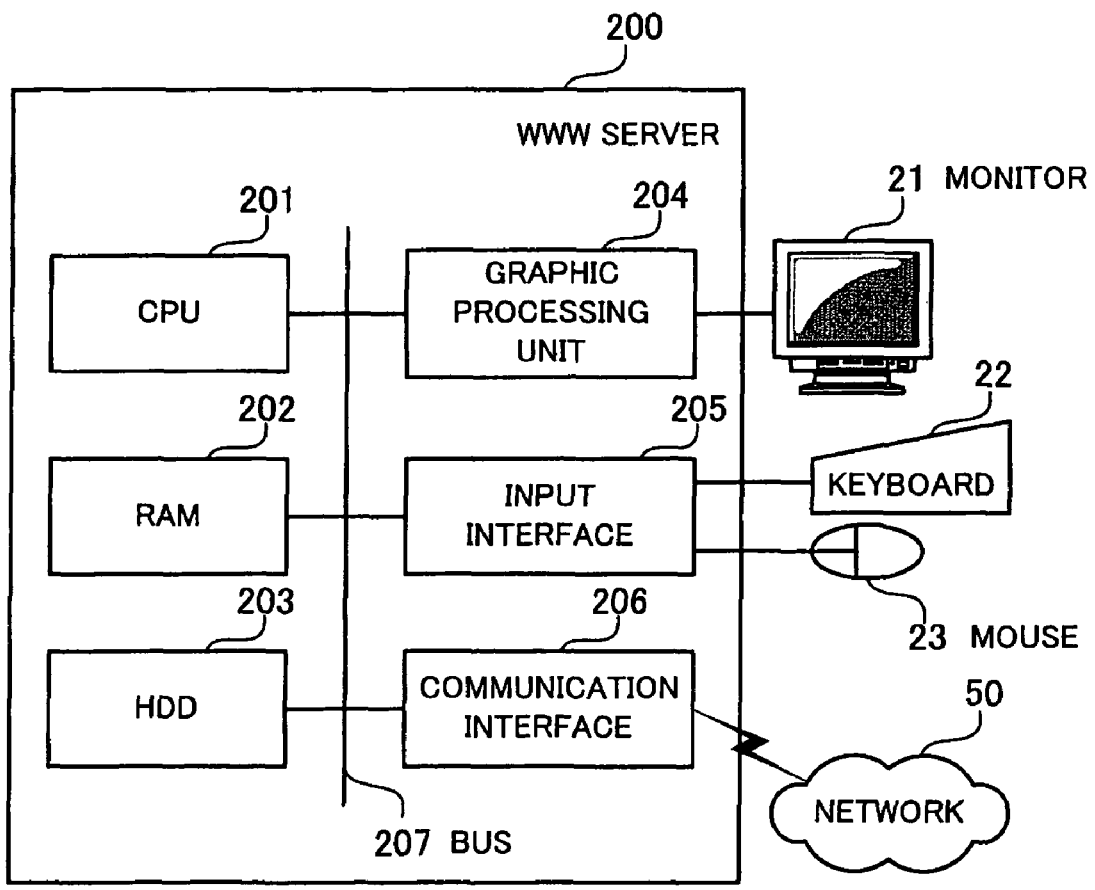
FIG. 4 is a diagram illustrating an example of a hardware construction of a WWW server.

FIG. 4 is a diagram illustrating an example of a hardware construction of the WWW server 200. The entire WWW server 200 is controlled by a CPU (Central Processing Unit) 201, to which a RAM (Random Access Memory) 202, an HDD (Hard Disk Drive) 203, a graphic processing unit 204, an input interface 205, and a communication interface 206 are connected through a bus 207. The RAM 202 temporarily stores at least portions of an OS (Operating System) program and application programs which are executed by the CPU 201, as well as various types of data necessary for processing by the CPU 201. The HDD 203 stores the OS program, the application programs, and various data to be saved. A monitor 21 is connected to the graphic processing device 204, which makes the monitor 21 display an image on a screen in accordance with an instruction from the CPU 201. A keyboard 22 and a mouse 23 are connected to the input interface 205, which transmits signals sent from the keyboard 22 and the mouse 23, to the CPU 201 through the bus 207. The communication interface 206 is connected to the network 50, and exchanges data with other computers through the network 50.

Figure 5:
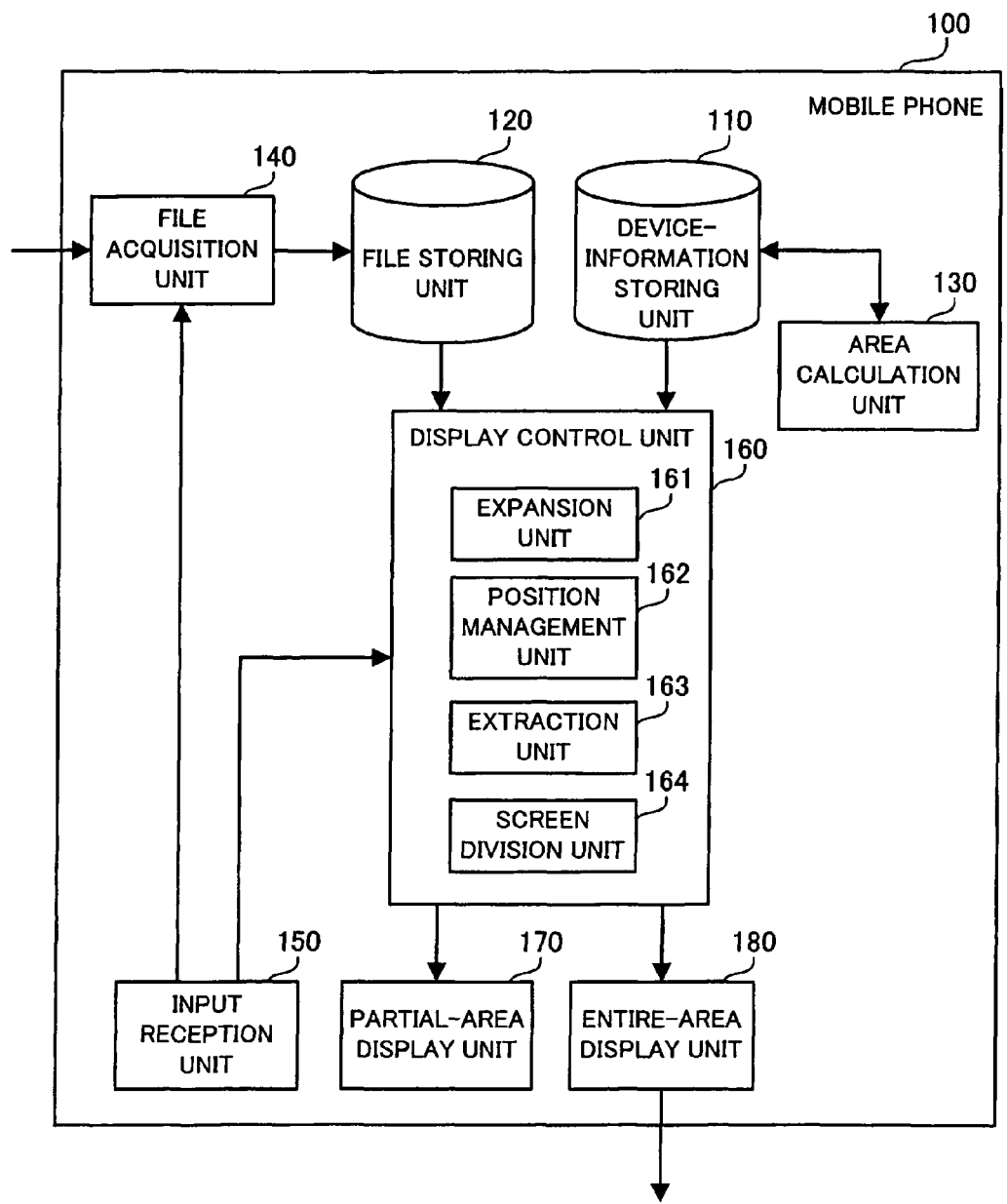
FIG. 5 is a block diagram illustrating the processing functions of the mobile phone according to the first embodiment.

FIG. 5 is a block diagram illustrating the processing functions of the mobile phone mobile phone 100 according to the first embodiment. The function modules indicated in FIG. 5 are realized when the mobile phone 100 executes a program for display control (display control program) which is acquired from the WWW server 200. The other processing functions of the mobile phone 100 which are not related to the display control are not shown in FIG. 5.

The mobile phone 100 includes a device-information storing unit 110, a file storing unit 120, an area calculation unit 130, a file acquisition unit 140, an input reception unit 150, a display control unit 160, a partial-area display unit 170, and an entire-area display unit 180.

The device-information storing unit 110 stores in advance information on the display areas of the display unit 104 (which is built in the mobile phone 100) and the electronic-paper displays 31, 32, and 33. Specifically, the mobile phone 100 stores information indicating the numbers of pixels arrayed in the vertical and horizontal directions in each display device. In addition, the area calculation unit 130 stores in the device-information storing unit 110 area-identification information for dividing the display area of the electronic-paper displays 31, 32, and 33 into the partial areas.

The file storing unit 120 stores files of content items such as HTML documents and images. The file acquisition unit 140 stores files of content items in the file storing unit 120 when necessary.

When the display control program is executed, first, the area calculation unit 130 confirms the type of an electronic-paper display which is currently connected to the mobile phone 100, and checks whether or not area-identification information corresponding to the currently connected electronic-paper display is stored in the device-information storing unit 110. When the area-identification information corresponding to the currently connected electronic-paper display is not stored in the device-information storing unit 110, the area calculation unit 130 produces the area-identification information on the basis of the dimensions of the display areas of the currently connected electronic-paper display and the display unit 104, and stores the produced area-identification information in the device-information storing unit 110.

When the file acquisition unit 140 receives from the input reception unit 150 an instruction to acquire a file the file acquisition unit 140 acquires from the WWW server 200 a file of a content item designated by the instruction, and stores the acquired file in the file storing unit 120.

The input reception unit 150 detects an operational input through the keypad 105 by the user. When the operational input requests acquisition of a file, the input reception unit 150 instructs the file acquisition unit 140 to acquire the file. When the operational input requests a change of information displayed on an electronic-paper display, the input reception unit 150 informs the display control unit 160 of the change requested by the operational input.

The display control unit 160 includes an expansion unit 161, a position management unit 162, an extraction unit 163, and a screen division unit 164. The display control unit 160 instructs the expansion unit 161, the position management unit 162, the extraction unit 163, and the screen division unit 164 to control the information displayed on the display unit 104 and the electronic-paper display according to the operational input of which the display control unit 160 is informed by the input reception unit 150.

When the operational input received by the input reception unit 150 designates a new content item, the expansion unit 161 acquires a file of the designated content item from the file storing unit 120, and acquires from the device-information storing unit 110 information on the display area of the electronic-paper display connected to the mobile phone 100. Then, the expansion unit 161 produces screen data of the entire content item by expanding the data of the content item contained in the acquired file so as to fit the entire screen data to the display area of the electronic-paper display connected to the mobile phone 100.

The position management unit 162 manages the range of the region of the screen data which is produced by the expansion unit 161 and is currently displayed on the display unit 104.

The extraction unit 163 extracts a portion of the screen data produced by the expansion unit 161, on the basis of the area-identification information stored in the device-information storing unit 110, and outputs the extracted portion to the partial-area display unit 170. Specifically, when the operational input received by the input reception unit 150 designates a new content item, the extraction unit 163 extracts a portion, corresponding to the upper-left partial area, of the screen data produced by the expansion unit 161. When the operational input received by the input reception unit 150 requests a change of the region to be displayed by the display unit 104, the extraction unit 163 determines the range of the region to be displayed by the display unit 104 after the change, and extracts a portion, in the determined range, of the screen data produced by the expansion unit 161.

The screen division unit 164 divides the entire screen data produced by the expansion unit 161, into a plurality of portions to be displayed in a plurality of partial areas on the basis of the area-identification information stored in the device-information storing unit 110. Then, the screen division unit 164 adds to the entire screen data information on an identifier for identifying each partial area, and outputs the entire screen data to the entire-area display unit 180.

When the partial-area display unit 170 acquires the portion of the screen data from the display control unit 160, the partial-area display unit 170 makes the display unit 104 display an image represented by the portion of the screen data. When the entire-area display unit 180 acquires the entire screen data from the display control unit 160, the entire-area display unit 180 outputs the entire screen data to the electronic-paper display currently connected to the mobile phone 100.

Figure 6:
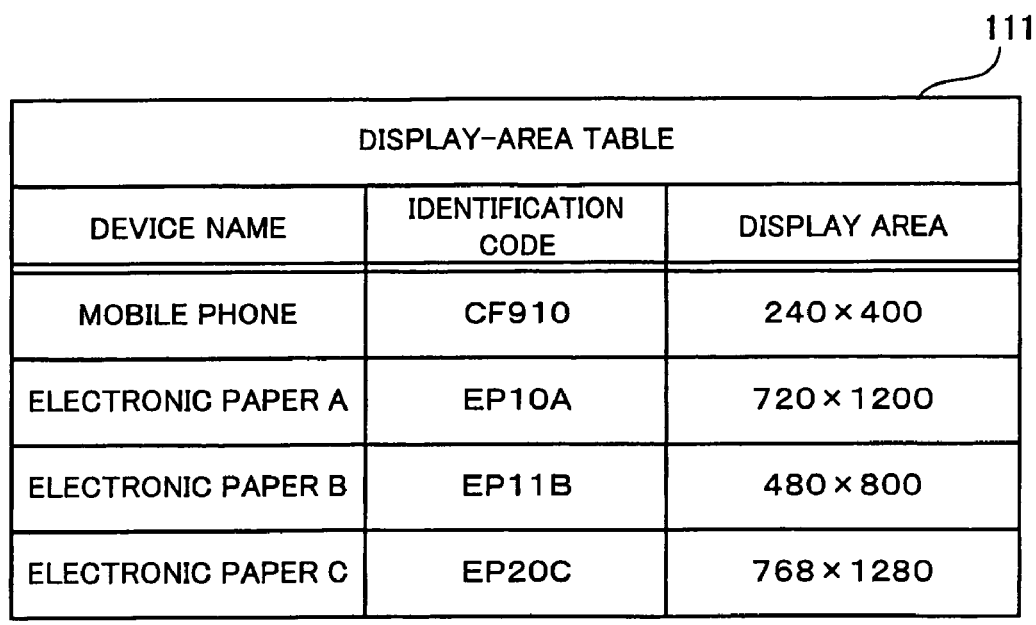
FIG. 6 is a diagram illustrating an example of a data structure of a display-area table.

FIG. 6 is a diagram illustrating an example of a data structure of the display-area table, which is stored in the device-information storing unit 110. The display-area table 111 indicated in FIG. 6 stores display-area information for each display device, and has the fields of "Device Name," "Identification Code," and "Display Area." In the display-area table 111, the information items tabulated on each row are associated with each other, and the information items in each row constitute display-area information for a display device.

The name of each display device is set in the field "Device Name," the identification code uniquely assigned to each type of display device is set in the field "Identification Code," and the numbers of pixels arrayed in the horizontal and vertical directions are set in the field "Display Area."

The display-area information stored in the display-area table 111 is contained in a program file which is acquired from the WWW server 200. In addition, when a new type of electronic-paper display becomes able to be connected to the mobile phone 100, it is possible to additionally acquire only the display-area information for the new type of electronic-paper display from the WWW server 200 and register the acquired display-area information in the display-area table 111.

In the example indicated in FIG. 6, the information including the device name "Mobile Phone," the identification code "CF910," and the display area "240×400" is stored for the display unit 104, the information including the device name "Electronic-paper Display A," the identification code "EP10A," and the display area "720×1200" is stored for the electronic-paper display 31, the information including the device name "Electronic-paper Display B," the identification code "EP11B," and the display area "480×800" is stored for the electronic-paper display 32, and the information including the device name "Electronic-paper Display C," and the identification code "EP20C," and the display area "768×1280" is stored for the electronic-paper display 33.

The identification code is used for identifying the type of the electronic-paper display connected to the mobile phone 100. The mobile phone 100 can acquire the identification codes of the electronic-paper displays 31, 32, and 33 from the electronic-paper displays 31, 32, and 33 through the external connection interface 107.

The device-information storing unit 110 stores area-identification information for each electronic-paper display as well as the display-area information. The area-identification information indicates the positions at which the display areas of the electronic-paper displays 31, 32, and 33 are divided into the partial areas. The area-identification information is produced by the area calculation unit 130 on the basis of the display-area information when the display control program is started.

Figure 7:
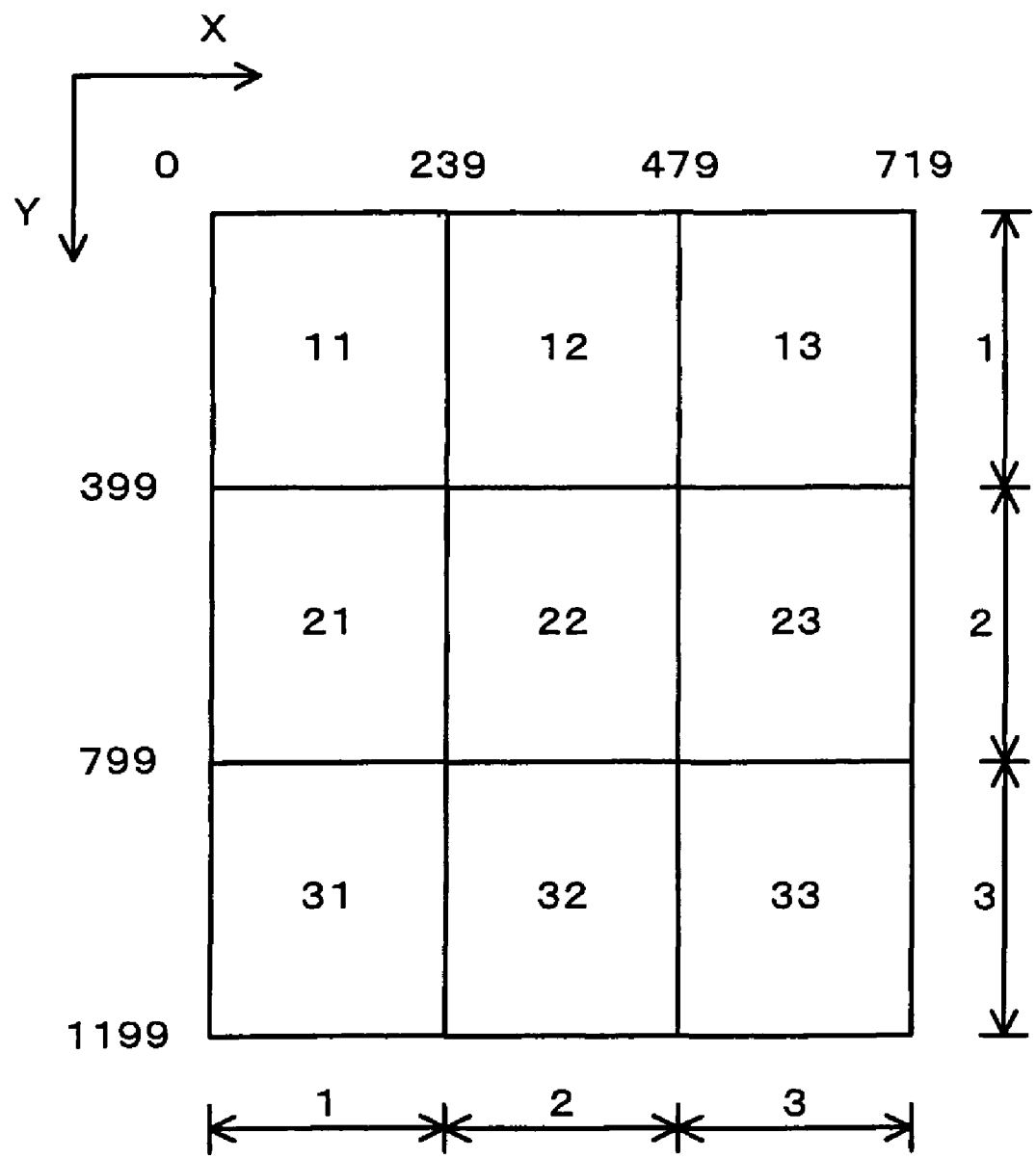
FIG. 7 is a diagram schematically illustrating division of screen data.

FIG. 7 is a diagram schematically illustrating division of screen data. In the example illustrated in FIG. 7, the display area of the electronic-paper display 31 is divided into a plurality of partial areas so that each of the partial areas fits the display area of the display unit 104. Since the dimensions of the display area of the electronic-paper display 31 are 720× 1200 pixels, and the dimensions of the display area of the display unit 104 are 240×400 pixels, the display area of the electronic-paper display 31 is divided into nine partial areas.

Specifically, assume that the coordinates of the upper-left corner of the display area of the electronic-paper display 31 are (0, 0), and the coordinates of the lower-right corner of the display area of the electronic-paper display 31 are (719, 1199). In this case, the display area of the electronic-paper display 31 can be divided into three sections 0 to 239, 240 to 479, and 480 to 719 in the horizontal (X-axis) direction and also into three sections 0 to 399, 400 to 799, and 800 to 1199 in the vertical (Y-axis) direction.

Identifiers are assigned to the partial areas as follows.

For example, the digits "1," "2," and "3" are respectively assigned to the sections 0 to 239, 240 to 479, and 480 to 719 in the horizontal direction, the digits "1," "2," and "3" are also respectively assigned to the sections 0 to 399, 400 to 799, and 800 to 1199 in the vertical direction, and the combination of the digits assigned to the corresponding sections (in the form of a two-digit number) is assigned to each partial area as an identifier. For example, the identifier "13" is assigned to the upper-right area.

Although the dimensions of the display area of the electronic-paper display 31 in the horizontal and vertical directions are respectively integer multiples of the dimensions of the display area of the display unit 104 in the horizontal and vertical directions, the dimensions of the display area of the electronic-paper display 33 are not integer multiples of the dimensions of the display area of the display unit 104. In the case where the dimensions of the display area of the electronic-paper display are not integer multiples of the dimensions of the display area of the display unit 104, an identifier may be or may not be assigned to the partial areas corresponding to the remainders of the integer division in the horizontal and vertical directions. It is possible to set the configuration of the mobile phone 100 so as to or not to assign an identifier to the partial areas corresponding to the remainders of the integer division in the horizontal and vertical directions.

Figure 8:
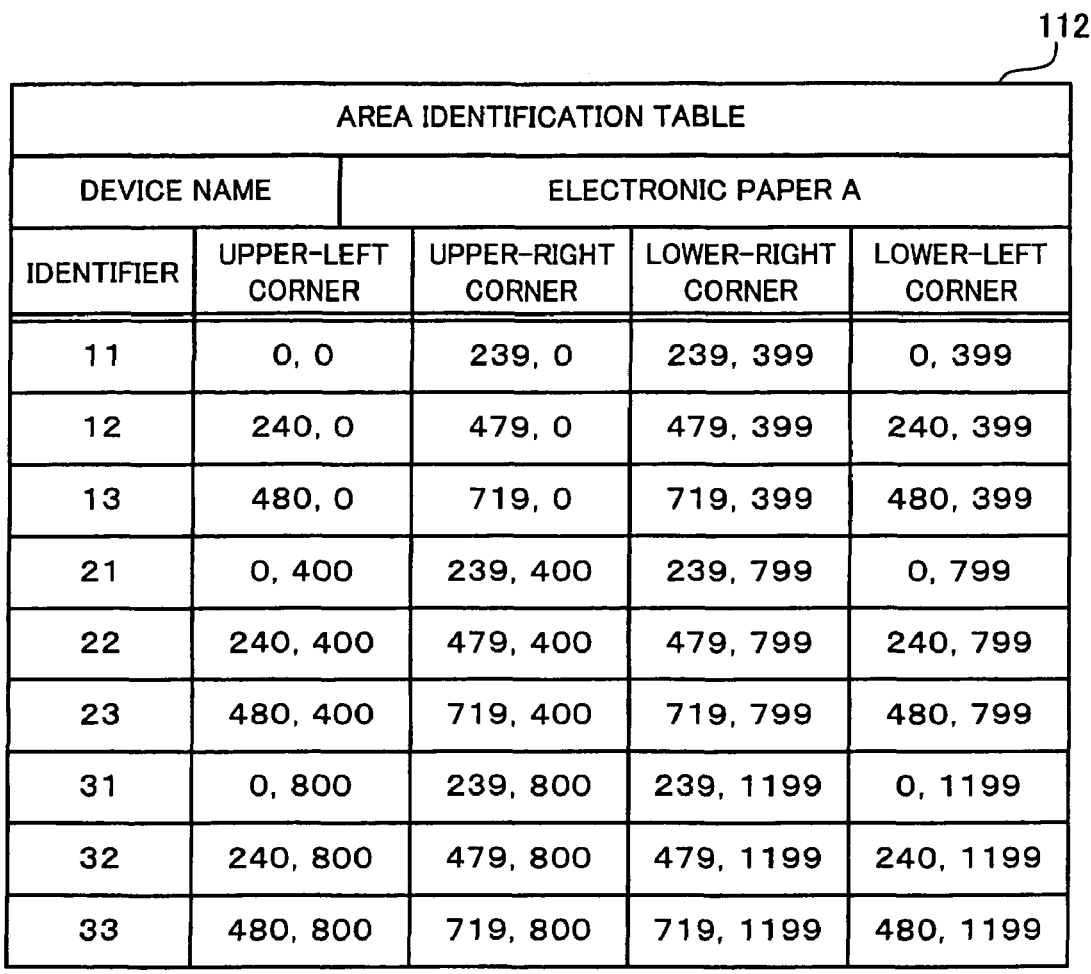
FIG. 8 is a diagram illustrating a first example of a data structure of an area identification table.

FIG. 8 is a diagram illustrating a first example of a data structure of an area identification table. The area identification table 112 indicated in FIG. 8 is a table storing the area-identification information for the electronic-paper display 31. The area identification table 112 has the fields of "Identifier," "Coordinates of Upper-left Corner," "Coordinates of Upper-right Corner," "Coordinates of Lower-right Corner," and "Coordinates of Lower-left Corner." In the area identification table 112, the information items tabulated on each row are associated with each other, and the information items in each row constitute area-identification information for a partial area.

The value of the identifier uniquely assigned to each partial area is set in the field "Identifier." In the example of FIG. 8, a two-digit number (as explained before) is set in the field "Identifier." In addition, a set of coordinates of the upper-left corner of each partial area is set in the field "Coordinates of Upper-left Corner," a set of coordinates of the upper-right corner of each partial area is set in the field "Coordinates of Upper-right Corner," a set of coordinates of the lower-right corner of each partial area is set in the field "Coordinates of Lower-right Corner," and a set of coordinates of the lower-left corner of each partial area is set in the field "Coordinates of Lower-left Corner."

The area-identification information stored in the area identification table 112 is registered by the area calculation unit 130 when the display control program is started. For example, the identifier "11," the coordinates (0, 0) of the upper-left corner, the coordinates (239, 0) of the upper-right corner, the coordinates (239, 399) of the lower-right corner, and the coordinates (0, 399) of the lower-left corner are registered for the upper-left area in the example of FIG. 7.

Figure 9:
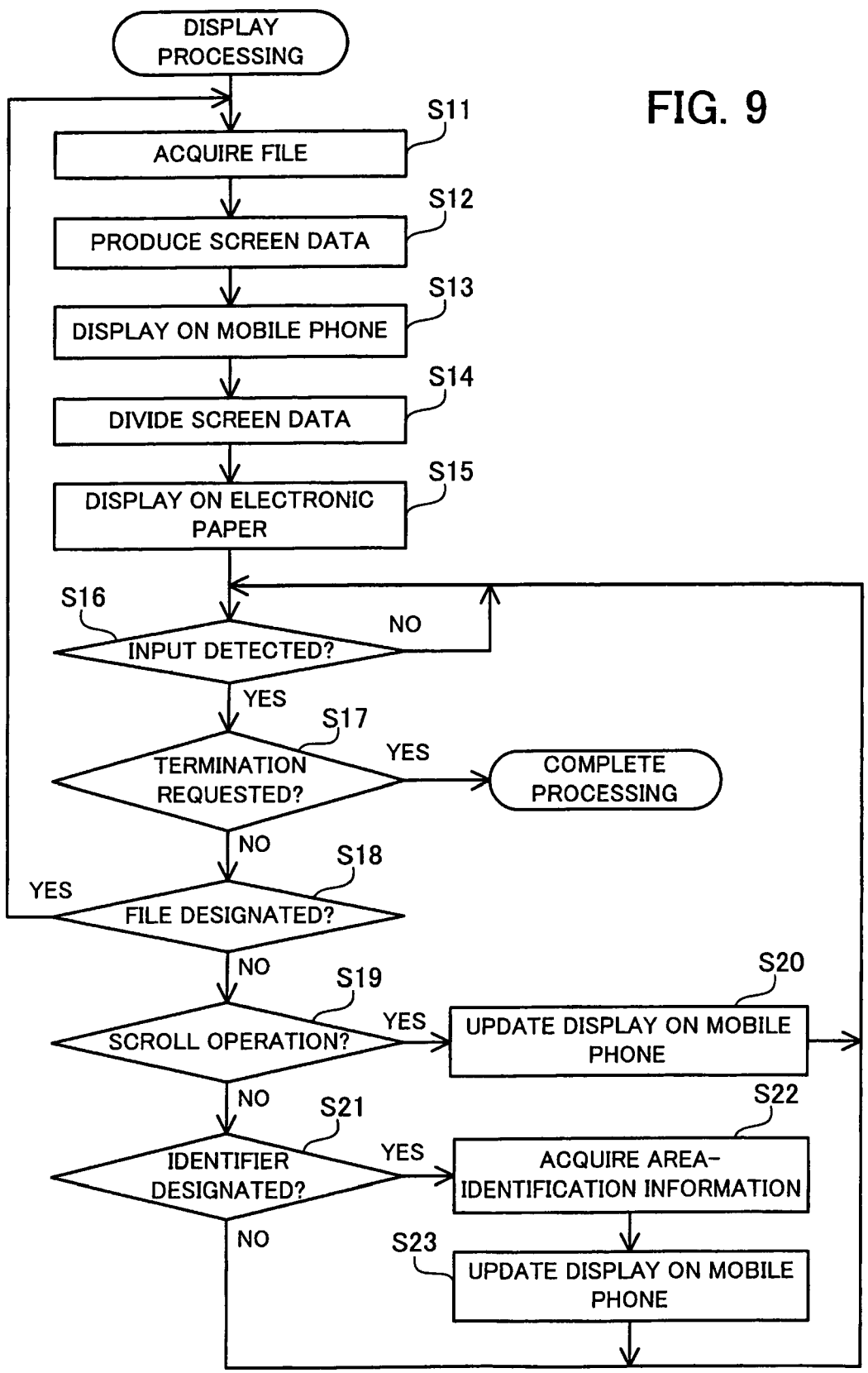
FIG. 9 is a flow diagram indicating a sequence of display processing according to the first embodiment.

FIG. 9 is a flow diagram indicating a sequence of display processing according to the first embodiment. In the following explanations, it is assumed that the electronic-paper display 31 is connected to the mobile phone 100. The processing indicated in FIG. 9 is explained below step by step.

<Step S11> The input reception unit 150 receives an operational input by the user, and determines an address indicating a file to be acquired, where the address is, for example, an URL (Uniform Resource Locator). Then, the input reception unit 150 instructs the file acquisition unit 140 to acquire the file indicated by the determined address. Thus, the file indicated by the determined address is stored in the file storing unit 120. Thereafter, the input reception unit 150 informs the display control unit 160 of the file name.

<Step S12> The expansion unit 161 acquires from the file storing unit 120 the file corresponding to the file name of which the display control unit 160 is informed by the input reception unit 150. In addition, the expansion unit 161 acquires the display-area information for the electronic-paper display 31 from the display-area table 111 (stored in the device-information storing unit 110), and produces screen data of the content item in the acquired file by expanding the data of the content item contained in the acquired file so as to fit the entire screen data to the display area of the electronic-paper display 31.

<Step S13> The extraction unit 163 determines the range of the upper-left area by reference to the area identification table 112 stored in the device-information storing unit 110, and extracts from the screen data produced in step S12 a portion of the screen data in the determined range. Thereafter, the extraction unit 163 outputs the extracted portion of the screen data to the partial-area display unit 170. In addition, the position management unit 162 holds information on the range of the partial area determined by the extraction unit 163, as information on the range of the area currently displayed by the display unit 104.

<Step S14> The screen division unit 164 divides the screen data produced in step S12, into a plurality of portions to be displayed in a plurality of partial areas, by reference to the area identification table 112. Then, the screen division unit 164 adds area-indication data to the entire screen data in order to visualize the range of the partial area and the identifier. The manner of indication of the range of the partial area and the identifier is explained later by example.

<Step S15> The screen division unit 164 outputs to the entire-area display unit 180 the entire screen data obtained in step S14, so that the content item designated by the user is displayed on the electronic-paper display 31.

<Step S16> The input reception unit 150 determines whether or not an operational input by the user is detected. When yes is determined in step S16, the operation goes to step S17. When no is determined in step S16, the input reception unit 150 repeats the operation in step S16.

<Step S17> The input reception unit 150 determines whether or not the operational input by the user is made for terminating browsing of the content item. When yes is determined in step S17, the processing of FIG. 9 is completed. When no is determined in step S17, the operation goes to step S18.

<Step S18> The input reception unit 150 determines whether or not the operational input by the user is made for designation of a file. The operational input made for designation of a file is, for example, an operation of designating a hyperlink in an HTML document. When yes is determined in step S18, the operation goes to step S11. When no is determined in step S18, the operation goes to step S19.

<Step S19> The input reception unit 150 determines whether or not the operational input by the user is a scroll operation of the screen of the display unit 104. The scroll operation of the screen of the display unit 104 is, for example, pressing of a scroll key on the keypad 105. When yes is determined in step S19, the operation goes to step S20. When no is determined in step S19, the operation goes to step S21.

<Step S20> While the scroll operation continues, the input reception unit 150 continuously informs the display control unit 160 of the direction of the scroll. The extraction unit 163 determines the range of the area to be displayed by the display unit 104 after the scroll, on the basis of the direction of the scroll (of which the display control unit 160 is informed by the input reception unit 150) and information on the range of the area currently displayed by the display unit 104 (which is managed by the position management unit 162). In addition, the extraction unit 163 extracts from the screen data produced in step S12 a portion of the screen data in the range determined as above, and outputs the extracted portion to the partial-area display unit 170. The position management unit 162 holds information on the range determined by the extraction unit 163 as the information on the range of the area currently displayed by the display unit 104. The processing for changing the range of the area currently displayed by the display unit 104 is repeatedly performed while the display control unit 160 is continuously informed by the input reception unit 150 of the direction of the scroll. Thereafter, the operation goes to step S16.

<Step S21> The input reception unit 150 determines whether or not the operational input by the user is input of an identifier. The input of the identifier is, for example, pressing of an input key on the keypad 105. When yes is determined in step S21, the operation goes to step S22. When no is determined in step S21, the operation goes to step S16.

<Step S22> The input reception unit 150 informs the display control unit 160 of the inputted identifier. The extraction unit 163 determines the range of the partial area corresponding to the identifier of which the display control unit 160 is informed by the input reception unit 150, by reference to the area identification table 112.

<Step S23> The extraction unit 163 extracts from the screen data produced in step S12 a portion of the screen data corresponding to the range determined in step S22, and outputs the extracted portion to the partial-area display unit 170. The position management unit 162 holds information on the range of the partial area determined by the extraction unit 163 as the information on the range of the area currently displayed by the display unit 104.

Thus, the operations of the mobile phone 100 according to the first embodiment are summarized as follows.

When the input reception unit 150 acquires the address of a file as above, the input reception unit 150 instructs the file acquisition unit 140 to acquire the file. Then, the file acquisition unit 140 acquires from the WWW server 200 the file indicated by the address. Next, the display control unit 160 produces screen data of the entire content item of the file acquired by the file acquisition unit 140, by expanding the data of the content item contained in the acquired file. In addition, the display control unit 160 makes the display unit 104 display a portion of the screen data corresponding to the upper-left area. Further, the display control unit 160 adds to the entire screen data indicating the range of the partial area and the identifier, and makes the electronic-paper display 31 display the entire screen data.

Thereafter, when the user inputs one of the identifiers at the sight of the screen of the electronic-paper display 31, the display control unit 160 determines the range of the partial area corresponding to the inputted identifier, and displays on the display unit 104 the screen data corresponding to the determined range. In addition, when the user performs a scroll operation, the display control unit 160 changes the range of the area displayed on the display unit 104.

Figure 10:
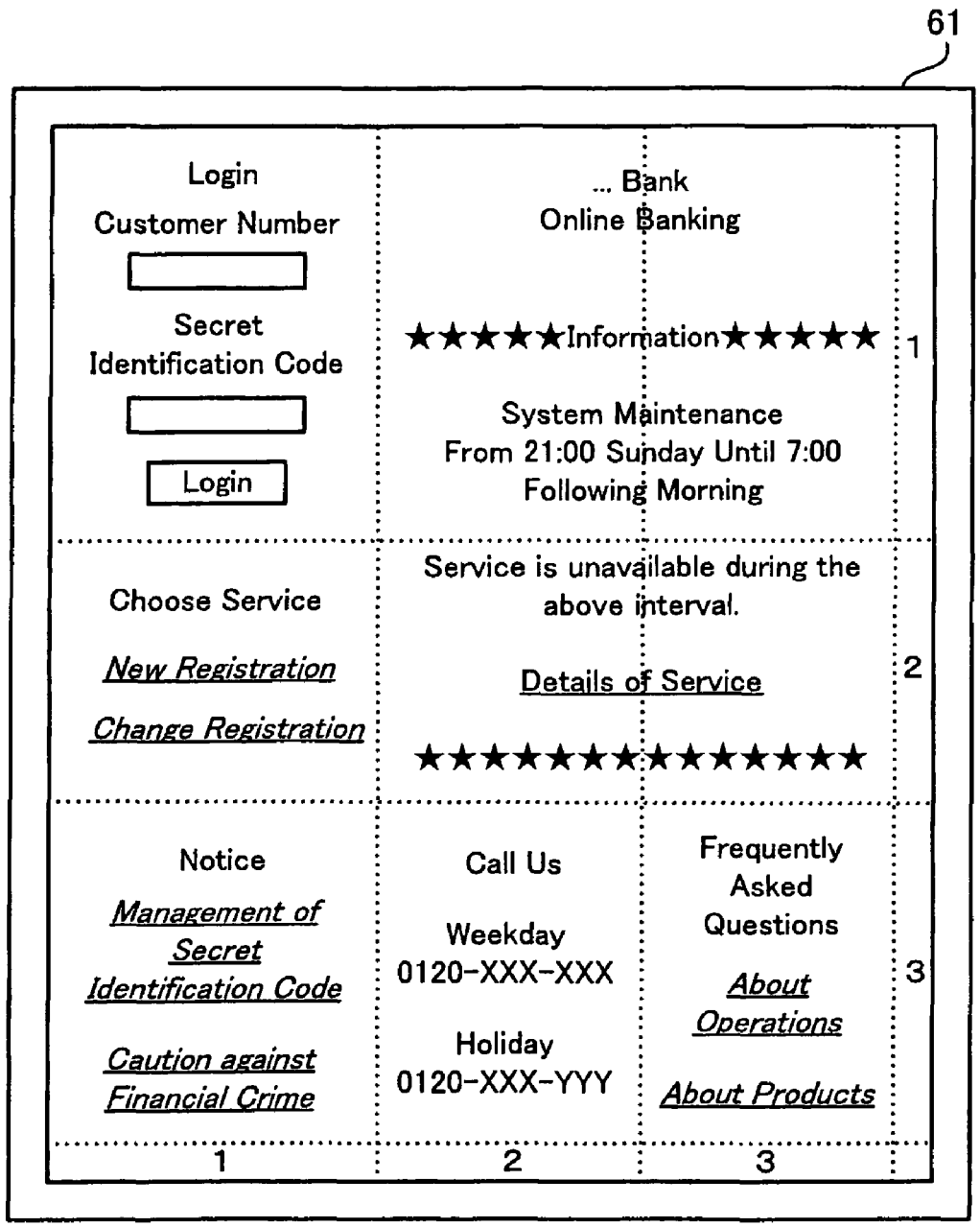
FIG. 10 is a diagram illustrating a first exemplary screen displayed on an electronic-paper display according to the first embodiment.

FIG. 10 is a diagram illustrating a first exemplary screen displayed on an electronic-paper display according to the first embodiment. The screen 61 indicated in FIG. 10 is displayed on the electronic-paper display 31. The numbers indicating the positions of the partial areas in the horizontal direction are indicated along the bottom of the screen 61, and the numbers indicating the positions of the partial areas in the vertical direction are indicated along the right side of the screen 61. Each combination of digits indicating positions in the horizontal and vertical directions (in the form of a two-digit number) realizes an identifier. In the screen 61 of FIG. 10, the boundaries between the partial areas are indicated by dotted lines, and the underlined character strings are hyperlinks.

Figure 11:
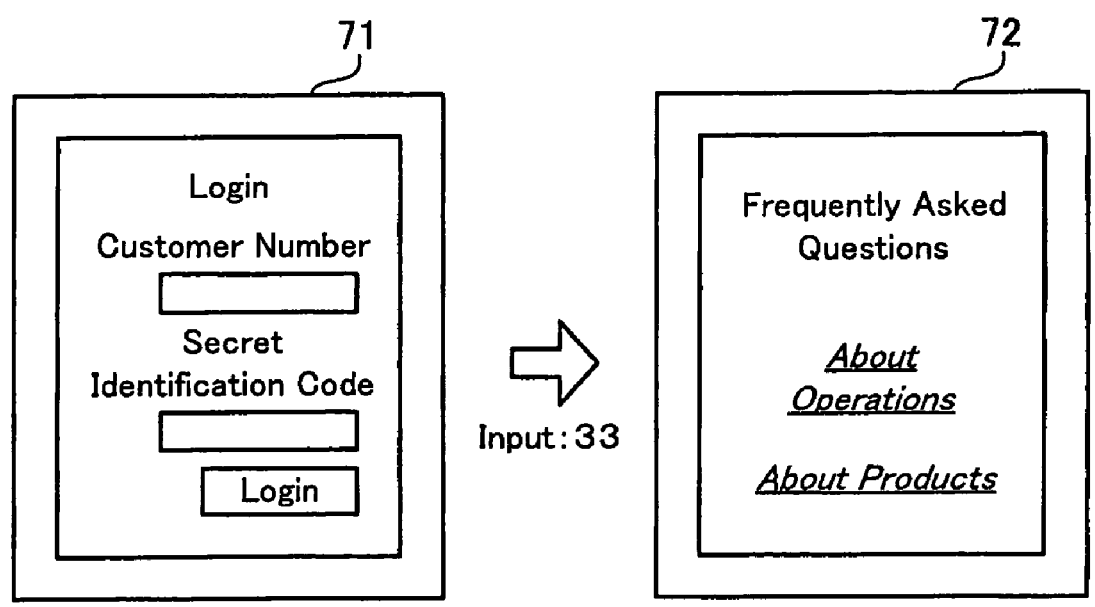
FIG. 11 is a diagram illustrating exemplary screens displayed on the mobile phone.

FIG. 11 is a diagram illustrating exemplary screens displayed on the mobile phone. When the screen 61 (indicated in FIG. 10) is displayed on the electronic-paper display 31, the screen 71 indicated in FIG. 11 is initially displayed on the display unit 104. The information indicated in the screen 71 is identical to the information indicated in the partial (upper-left) area with the identifier "11" in the screen 61. When the user inputs the identifier "33" through the keypad 105, the screen 72 is displayed on the display unit 104. The information indicated in the screen 72 is identical to the information indicated in the partial area with the identifier "33" in the screen 61. Then, the user performs an operation of designating one of the hyperlinks indicated in the screen 72, so that a content item linked by the designated hyperlink can be displayed on the electronic-paper display 31.

Alternatively, the range and the identifier of each partial area may be indicated on the electronic-paper display 31 in any manners other than the manner indicated in FIG. 10. For example, it is possible to prepare a plurality of manners of indication of the range and the identifier of each partial area in advance. In this case, the user can select one of the manners and set the selected manner in the mobile phone 100. Two examples of the manners of indication of the range and the identifier of each partial area in advance other than the manner indicated in FIG. 10 are indicated below.

FIG. 12 is a diagram illustrating a second exemplary screen displayed on the electronic-paper display according to the first embodiment. The screen 62 indicated in FIG. 12 is displayed on the electronic-paper display 31. In the screen 62 of FIG. 12, the boundaries between the partial areas are indicated by dotted lines, and a two-digit number as the identifier of each partial area is indicated near the upper-right corner of each partial area. Since the identifier of each partial area is indicated in the partial area, the user can instantly recognize the correspondence between the partial area and the identifier.

Although the two-digit number is used as each identifier in the examples of the screens 61 and 62 indicated in FIGS. 10 and 12, it is possible to use a one-digit number as each identifier when the number of partial areas does not exceed ten. For example, it is possible to assign identifiers to the partial areas in correspondence with the arrangement of the input keys on the keypad 105.

FIG. 13 is a diagram illustrating a second example of the data structure of the area identification table. The area identification table 112a indicated in FIG. 13, instead of the area identification table 112 of FIG. 8, is stored in the device-information storing unit 110 in the case where a one-digit number is used as each identifier. In the area identification table 112a of FIG. 13, one-digit numbers are set in the field of "Identifier." The values set in the other fields in the area identification table 112a are identical to the values in area identification table 112.

Figure 14:
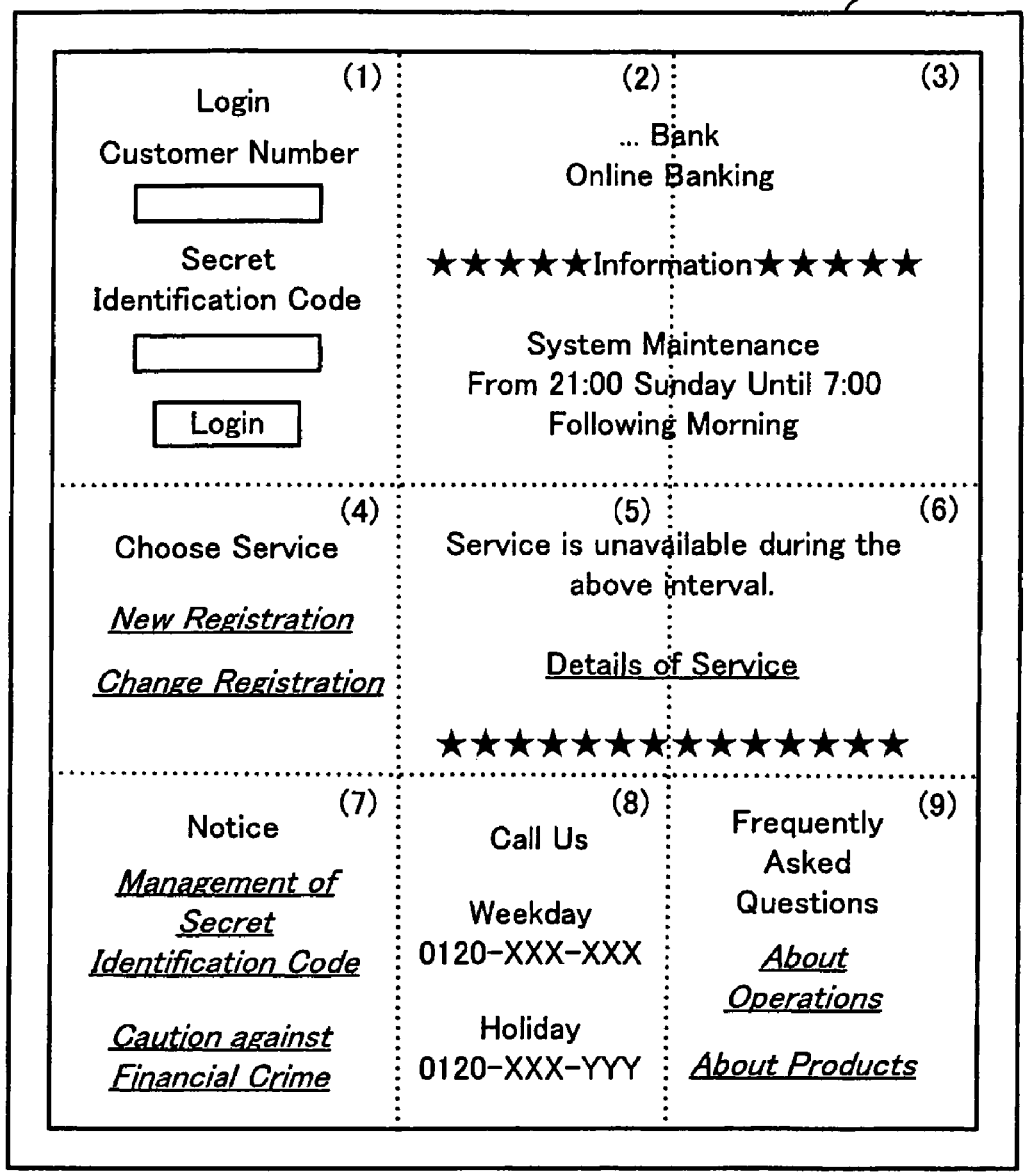
FIG. 14 is a diagram illustrating a third exemplary screen displayed on the electronic-paper display according to the first embodiment.

FIG. 14 is a diagram illustrating a third exemplary screen displayed on the electronic-paper display according to the first embodiment. The screen 63 indicated in FIG. 14 is displayed on the electronic-paper display 31 in the case where the area identification table 112a of FIG. 13 is stored in the device-information storing unit 110. In the screen 63 of FIG. 14, the boundaries between the partial areas are indicated by dotted lines, the identifiers are assigned to the partial areas in correspondence with the arrangement of the input keys on the keypad 105, and a one-digit number as the identifier of each partial area is indicated near the upper-right corner of each partial area. Since the identifiers are assigned to the partial areas in correspondence with the arrangement of the input keys on the keypad 105, it is possible to reduce the burden of the operation of inputting the identifier which is imposed on the user.

When the mobile phone as described above is used, it is possible to acquire a content item through a network, and display the entire content item on the display area of an electronic-paper display which is greater than the display area of the built-in display of the mobile phone. In addition, the user can instantly move the area displayed on the built-in display to a desired position by simply inputting an identifier. Therefore, the user can smoothly perform the operation of displaying a content item by tracing a hyperlink from another content item. Further, since the user can perform the operation while viewing the built-in display, it is possible to positively reduce the operation errors.

Next, the second embodiment is explained with reference to FIGS. 15 to 18. The mobile phone according to the second embodiment is configured so that the user can recognize the range of the area currently displayed on the built-in display of the mobile phone at the sight of the electronic-paper display. The following explanations are focused on the differences from the first embodiment, and similar features to the first embodiment are not explained.

In the following explanations, a content delivery system according to the second embodiment is assumed to have a system configuration similar to the configuration of the content delivery system according to the first embodiment (as illustrated in FIG. 2), although a mobile phone 100a, instead of the mobile phone 100 according to the first embodiment, is used in the content delivery system according to the second embodiment. Part of the processing functions of the mobile phone 100a according to the second embodiment which are realized by execution of a program for display control (i.e., a display control program) are different from the processing functions of the mobile phone 100 according to the first embodiment as explained below.

Figure 15:
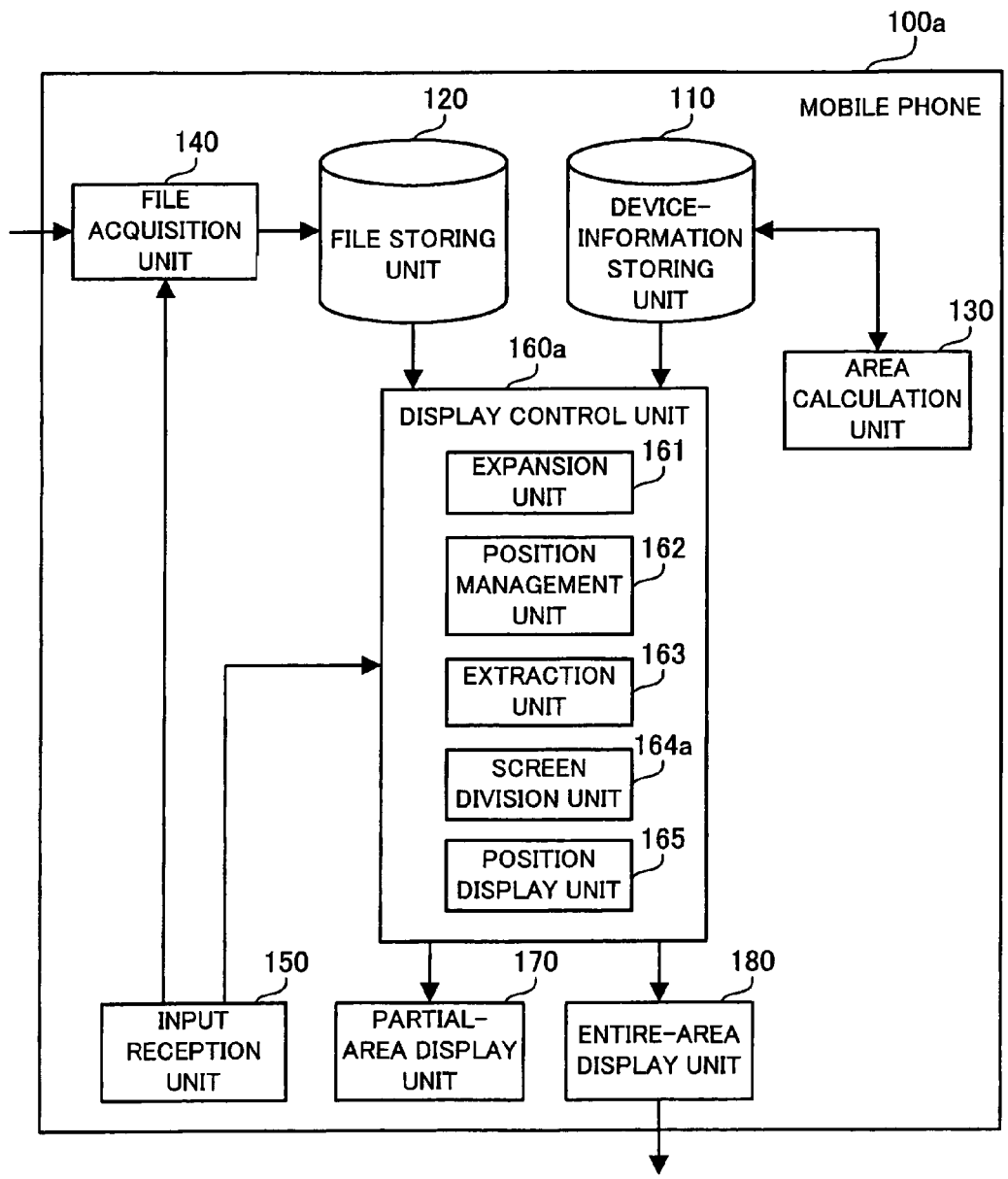
FIG. 15 is a block diagram illustrating the processing functions of a mobile phone according to a second embodiment.

The processing functions of the mobile phone 100a according to the second embodiment are explained below with reference to FIG. 15, which is a block diagram illustrating the processing functions of the mobile phone 100a according to the second embodiment. The mobile phone 100a of FIG. 15 includes the device-information storing unit 110, the file storing unit 120, the area calculation unit 130, the file acquisition unit 140, the input reception unit 150, a display control unit 160a, the partial-area display unit 170, and the entire-area display unit 180. The processing functions of the mobile phone 100a other than the display control unit 160a are similar to the corresponding processing functions of the mobile phone 100 according to the first embodiment.

The display control unit 160a includes the expansion unit 161, the position management unit 162, the extraction unit 163, a screen division unit 164a, and a position display unit 165. The processing functions of the expansion unit 161, the position management unit 162, and the extraction unit 163 are identical to the corresponding processing functions of the mobile phone 100 according to the first embodiment.

When the expansion unit 161 produces the entire screen data, the screen division unit 164a divides the entire screen data into a plurality of portions to be displayed in a plurality of partial areas, adds to the entire screen data information on an identifier for identifying each partial area, and outputs the entire screen data to the electronic-paper display currently connected to the mobile phone 100. Then, the screen division unit 164a sends the entire screen data to the position display unit 165.

When the position display unit 165 receives the entire screen data from the screen division unit 164a, the position display unit 165 acquires from the position management unit 162 information on the range of the area which is currently displayed on the display unit 104. Then, the position display unit 165 adds to the entire screen data for highlighting the area currently displayed on the display unit 104, and outputs the entire screen data to the entire-area display unit 180.

The position display unit 165 monitors information on the range of the area managed by the position management unit 162. When the position display unit 165 detects that the area managed by the position management unit 162 is changed, the position display unit 165 adds data for highlighting the area currently displayed on the display unit 104, to the entire screen data acquired from the screen division unit 164a, and outputs the entire screen data to the entire-area display unit 180.

When the area which is currently displayed on the display unit 104 is continuously changed, the position display unit 165 outputs the screen data to the entire-area display unit 180 at predetermined time intervals. This is because the frame rates of the electronic-paper displays 31, 32, and 33 are relatively low, so that it is difficult to continuously update the information displayed on the electronic-paper displays 31, 32, and 33.

Figure 16:
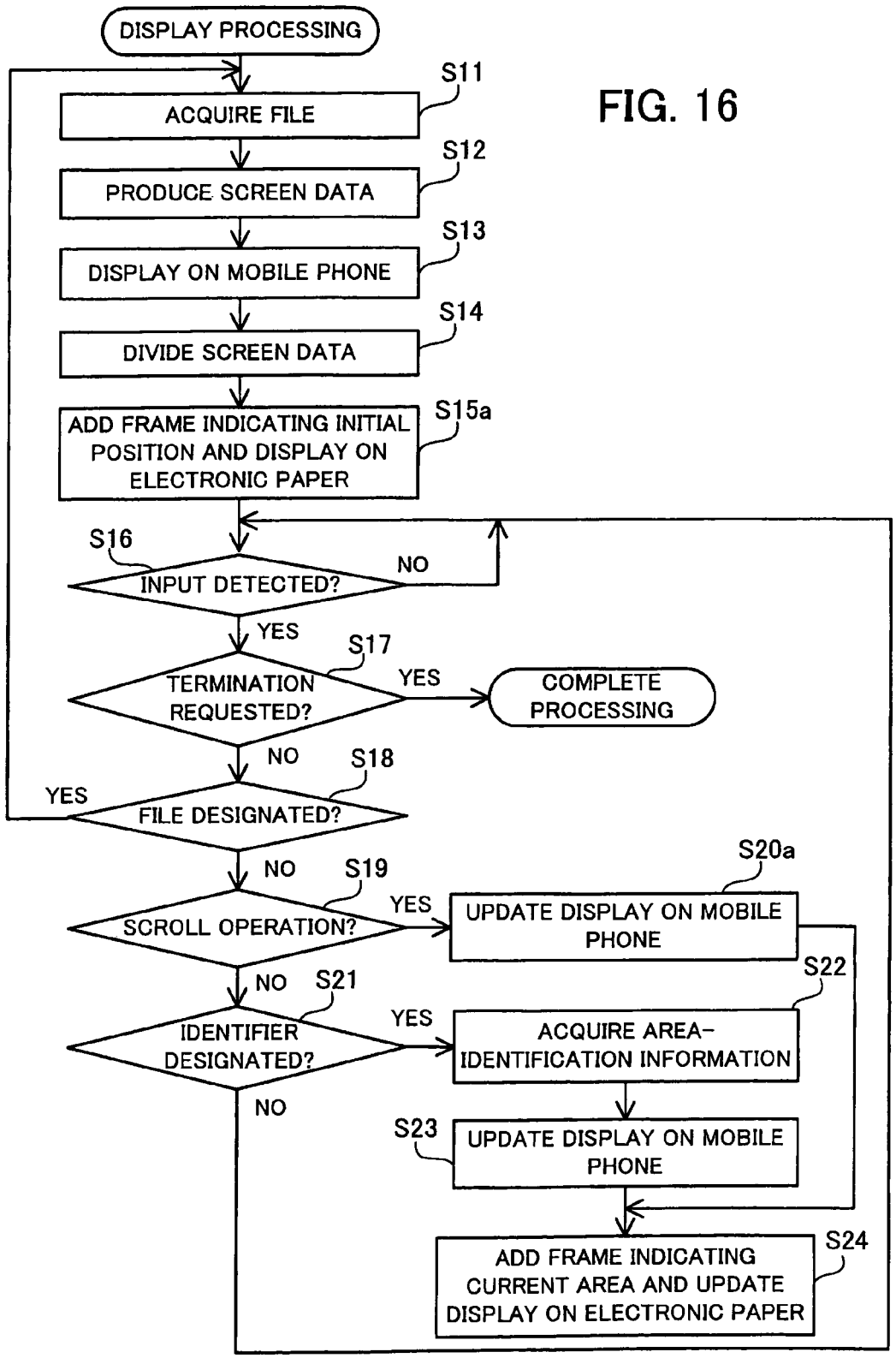
FIG. 16 is a flow diagram indicating a sequence of display processing according to the second embodiment.

FIG. 16 is a flow diagram indicating a sequence of display processing according to the second embodiment. In the following explanations, it is assumed that the electronic-paper display 31 is connected to the mobile phone 100a. The processing indicated in FIG. 16 is explained below step by step.

<Step S11> The input reception unit 150 receives an operational input by the user, and determines an address indicating a file to be acquired. The input reception unit 150 instructs the file acquisition unit 140 to acquire the file indicated by the determined address. Thereafter, the input reception unit 150 informs the display control unit 160a of the file name.

<Step S12> The expansion unit 161 acquires from the file storing unit 120 the file corresponding to the file name of which the display control unit 160a is informed by the input reception unit 150. In addition, the expansion unit 161 acquires from the display-area table 111 the display-area information for the electronic-paper display 31, and produces screen data of the entire content item of the acquired file by expanding the data of the content item contained in the acquired file so as to fit the entire screen data to the display area of the electronic-paper display 31.

<Step S13> The extraction unit 163 determines the range of the upper-left area by reference to the area identification table 112, and extracts from the screen data produced in step S12 a portion of the screen data in the determined range. Thereafter, the extraction unit 163 outputs the extracted portion of the screen data to the partial-area display unit 170. In addition, the position management unit 162 holds information on the range of the partial area determined by the extraction unit 163, as the information on the range of the area currently displayed by the display unit 104.

<Step S14> The screen division unit 164a divides the screen data produced in step S12, into a plurality of portions to be displayed in a plurality of partial areas, by reference to the area identification table 112. Then, the screen division unit 164a adds area-indication data to the entire screen data in order to visualize the range of the partial area and the identifier.

<Step S15a> The screen division unit 164a sends the entire screen data obtained in step S14 to the position display unit 165. The position display unit 165 acquires from the position management unit 162 the information on the range of the area currently displayed by the display unit 104. Then, the position display unit 165 adds to the entire screen data for highlighting the area currently displayed on the display unit 104, and outputs the entire screen data to the entire-area display unit 180.

<Step S16> The input reception unit 150 determines whether or not an operational input by the user is detected. When yes is determined in step S16, the operation goes to step S17. When no is determined in step S16, the input reception unit 150 repeats the operation in step S16.

<Step S17> The input reception unit 150 determines whether or not the operational input by the user is made for terminating browsing of the content item. When yes is determined in step S17, the processing of FIG. 16 is completed. When no is determined in step S17, the operation goes to step S18.

<Step S18> The input reception unit 150 determines whether or not the operational input by the user is made for designation of a file. When yes is determined in step S18, the operation goes to step S11. When no is determined in step S18, the operation goes to step S19.

<Step S19> The input reception unit 150 determines whether or not the operational input by the user is a scroll operation of the screen of the display unit 104. The scroll operation of the screen of the display unit 104 is, for example, pressing of a scroll key on the keypad 105. When yes is determined in step S19, the operation goes to step S20a. When no is determined in step S19, the operation goes to step S21.

<Step S20a> While the scroll operation continues, the input reception unit 150 continuously informs the display control unit 160a of the direction of the scroll. The extraction unit 163 determines the range of the area to be displayed by the display unit 104 after the scroll, on the basis of the direction of the scroll (of which the display control unit 160a is informed by the input reception unit 150) and the information on the range of the area currently displayed by the display unit 104 (which is managed by the position management unit 162). In addition, the extraction unit 163 extracts from the screen data produced in step S12 a portion of the screen data in the range determined as above, and outputs the extracted portion to the partial-area display unit 170. The position management unit 162 holds information on the range determined by the extraction unit 163 as the information on the range of the area currently displayed by the display unit 104. The processing for changing the range of the area currently displayed by the display unit 104 is repeatedly performed while the display control unit 160a is continuously informed by the input reception unit 150 of the direction of the scroll. Thereafter, when the input reception unit 150 ceases to inform the display control unit 160a of the direction of the scroll, or when a predetermined time elapses since the start of the operation in step S20a, the operation goes to step S24.

<Step S21> The input reception unit 150 determines whether or not the operational input by the user is input of an identifier. When yes is determined in step S21, the operation goes to step S22. When no is determined in step S21, the operation goes to step S16.

<Step S22> The input reception unit 150 informs the display control unit 160a of the inputted identifier. The extraction unit 163 determines the range of the partial area corresponding to the identifier of which the display control unit 160a is informed by the input reception unit 150, by reference to the area identification table 112.

<Step S23> The extraction unit 163 extracts from the screen data produced in step S12 a portion of the screen data corresponding to the range determined in step S22, and outputs the extracted portion to the partial-area display unit 170. The position management unit 162 holds information on the range of the partial area determined by the extraction unit 163 as the information on the range of the area currently displayed by the display unit 104.

<Step S24> The position display unit 165 acquires from the position management unit 162 the information on the range of the area currently displayed by the display unit 104. Then, the position display unit 165 adds to the entire screen data for highlighting the area currently displayed on the display unit 104, and outputs the entire screen data to the entire-area display unit 180.

Thus, the operations of the mobile phone 100a according to the second embodiment are summarized as follows.

When the input reception unit 150 acquires the address of a file as above, the input reception unit 150 instructs the file acquisition unit 140 to acquire the file. Then, the file acquisition unit 140 acquires from the WWW server 200 the file indicated by the address. Next, the display control unit 160a produces screen data of the entire content item of the file acquired by the file acquisition unit 140, by expanding the data of the content item contained in the acquired file. In addition, the display control unit 160a makes the display unit 104 display a portion of the screen data corresponding to the upper-left area. Further, the display control unit 160a adds to the entire screen data the data indicating the range of the partial area and the identifier and the data indicating the range of the area currently displayed on the display unit 104, and makes the electronic-paper display 31 display the entire screen data.

Thereafter, when the user inputs one of the identifiers at the sight of the screen of the electronic-paper display 31, the display control unit 160a determines the range of the partial area corresponding to the inputted identifier, and displays on the display unit 104 the screen data corresponding to the determined range. In addition, when the user performs a scroll operation, the display control unit 160a changes the range of the area displayed on the display unit 104. At this time, the display control unit 160a also updates the information displayed on the electronic-paper display 31.

Figure 17:
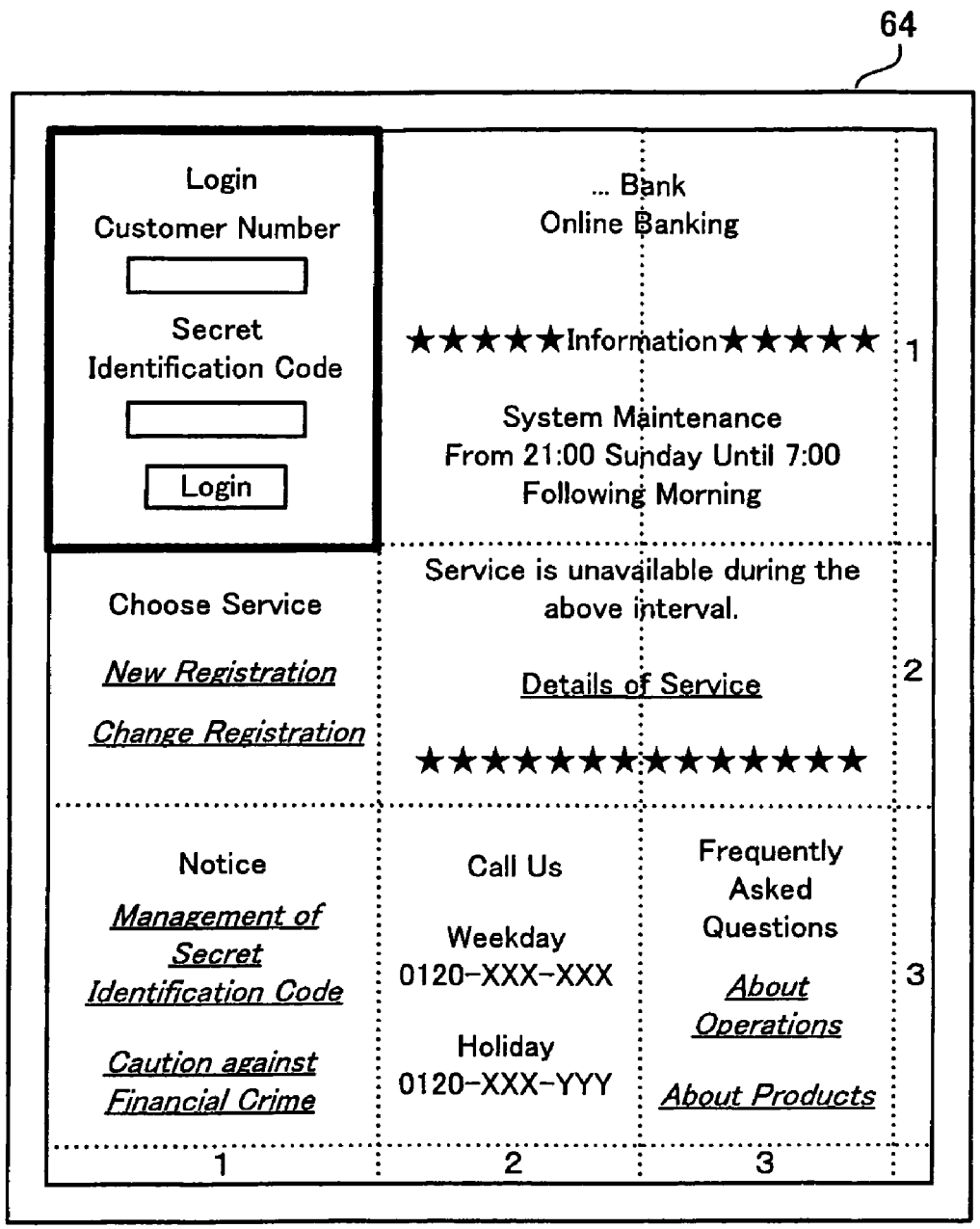
FIG. 17 is a diagram illustrating a first exemplary screen displayed on an electronic-paper display according to the second embodiment.

FIG. 17 is a diagram illustrating a first exemplary screen displayed on an electronic-paper display according to the second embodiment. The screen 64 indicated in FIG. 17 is displayed on the electronic-paper display 31. The information indicated in the screen 64 of FIG. 17 is the same as the information indicated in the screen 61 of FIG. 10. In addition, in the screen 64, a frame of (i.e., the boundary around) the area which is currently displayed on the display unit 104 is indicated by bold lines. In the screen 64 illustrated in FIG. 17, the area which is currently displayed on the display unit 104 is still at the initial position.

Figure 18:
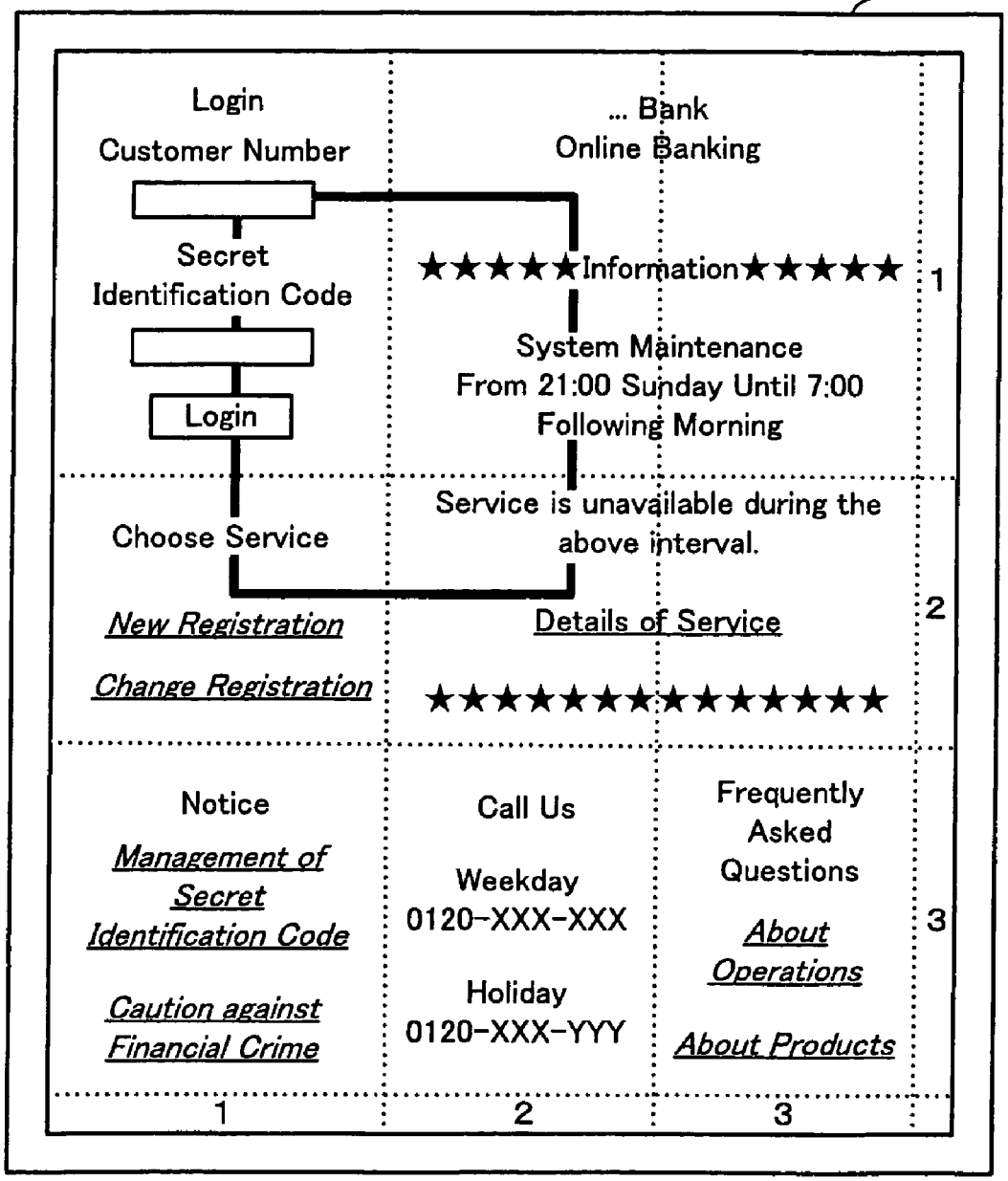
FIG. 18 is a diagram illustrating a second exemplary screen displayed on the electronic-paper display according to the second embodiment.

FIG. 18 is a diagram illustrating a second exemplary screen displayed on the electronic-paper display according to the second embodiment. The screen 65 indicated in FIG. 18 is displayed on the electronic-paper display 31 subsequently to the screen 64. FIG. 18 shows that the area which is currently displayed on the display unit 104 is changed from the initial position in response to a scroll operation by the user.

When the mobile phone according to the second embodiment as described above is used, it is possible to achieve similar advantages to the first embodiment. In addition, the user can easily recognize the position, in the entire screen, of the area currently displayed on the display unit 104 of the mobile phone.

Figure 19:
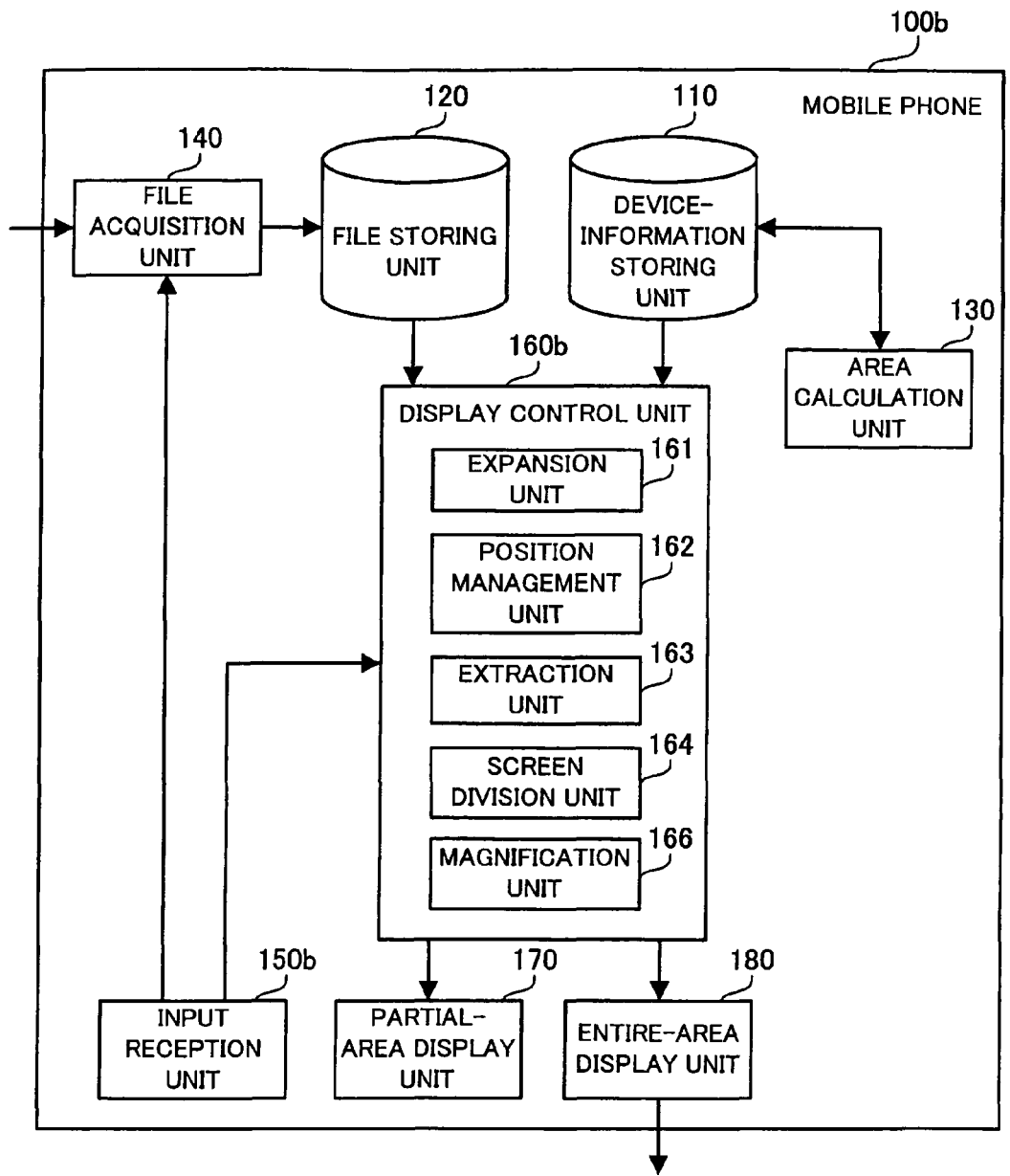
FIG. 19 is a block diagram illustrating the processing functions of a mobile phone according to a third embodiment.

Next, the third embodiment is explained with reference to FIGS. 19 to 21. The mobile phone according to the third embodiment is configured to enable an electronic-paper display to display a magnified image of the area displayed on the built-in display. The following explanations are focused on the differences from the first embodiment, and similar features to the first embodiment are not explained.

In the following explanations, a content delivery system according to the third embodiment is assumed to have a system configuration similar to the configuration of the content delivery system according to the first embodiment (as illustrated in FIG. 2), although a mobile phone 100b, instead of the mobile phone 100 according to the first embodiment, is used in the content delivery system according to the third embodiment. Part of the processing functions of the mobile phone 100b according to the third embodiment which are realized by execution of a program for display control (i.e., a display control program) are different from the processing functions of the mobile phone 100 according to the first embodiment.

The processing functions of the mobile phone 100b according to the third embodiment are explained below with reference to FIG. 19, which is a block diagram illustrating the processing functions of the mobile phone 100b according to the third embodiment. The mobile phone 100b of FIG. 19 includes the device-information storing unit 110, the file storing unit 120, the area calculation unit 130, the file acquisition unit 140, an input reception unit 150b, a display control unit 160b, the partial-area display unit 170, and the entire-area display unit 180. The processing functions of the device-information storing unit 110, the file storing unit 120, the area calculation unit 130, the file acquisition unit 140, the partial-area display unit 170, and the entire-area display unit 180 are similar to the corresponding processing functions of the mobile phone 100 according to the first embodiment.

The input reception unit 150b detects an operational input through the keypad 105 by the user. When the operational input requests acquisition of a file, the input reception unit 150b instructs the file acquisition unit 140 to acquire the file. When the operational input requests a change of information displayed on an electronic-paper display, the input reception unit 150b informs the display control unit 160b of the change requested by the operational input. At this time, the operational input requesting the change of information displayed on the electronic-paper display may include an input for requesting a magnified display as well as the input as explained before for the first embodiment.

The display control unit 160b includes the expansion unit 161, the position management unit 162, the extraction unit 163, the screen division unit 164, and a magnification unit 166. The processing function of the expansion unit 161, the position management unit 162, the extraction unit 163, and the screen division unit 164 are identical to the corresponding processing functions of the mobile phone 100 according to the first embodiment.

When the magnification unit 166 is informed by the input reception unit 150b of the operational input requesting a magnified display, the magnification unit 166 acquires from the device-information storing unit 110 the display-area information for the electronic-paper display 31 connected to the mobile phone 100b. Then, the magnification unit 166 performs processing for magnifying the image of the screen data extracted by the extraction unit 163 so as to produce magnified screen data which fits the display area of the electronic-paper display, and outputs the magnified screen data to the entire-area display unit 180.

Figure 20:
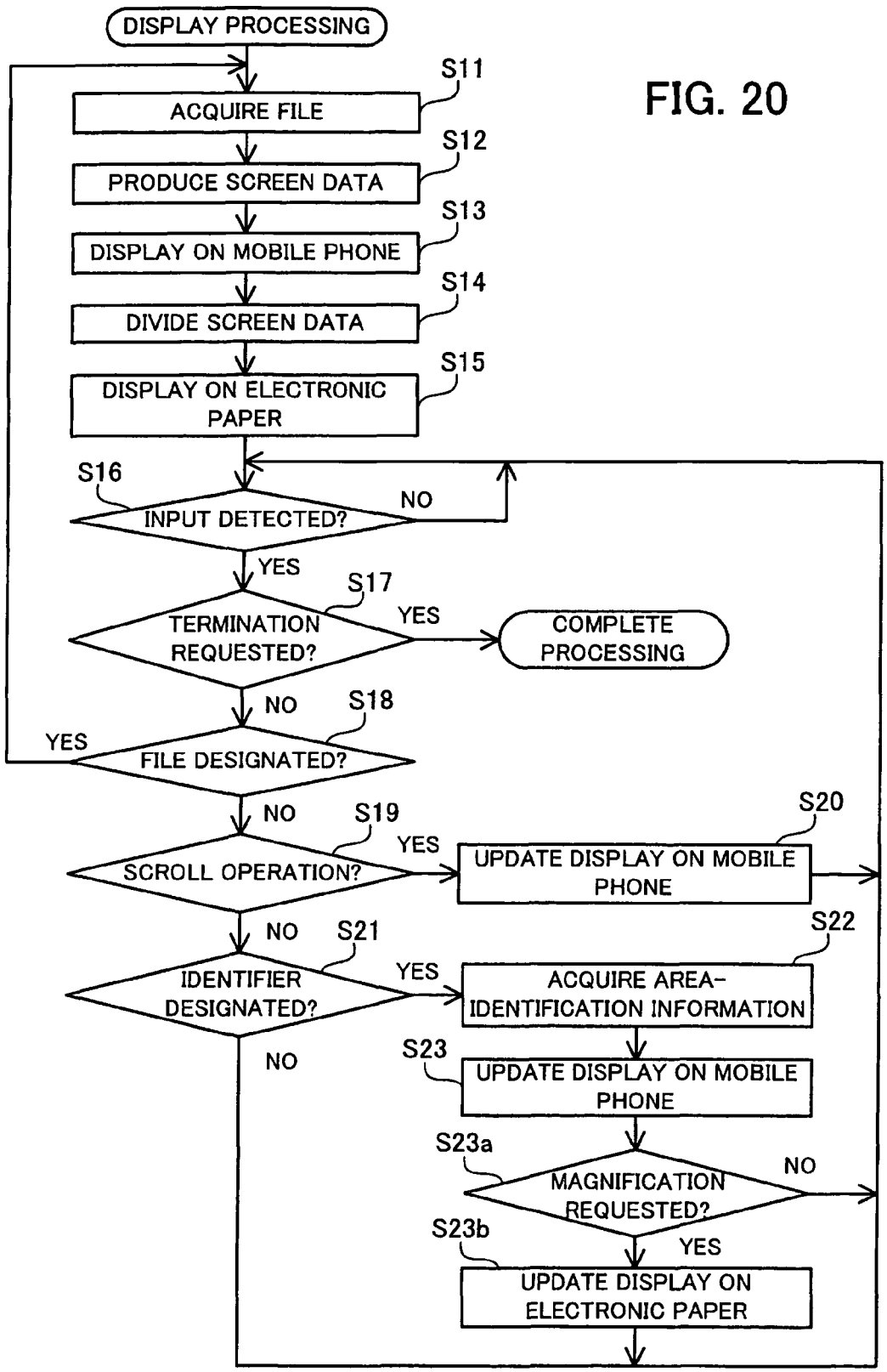
FIG. 20 is a flow diagram indicating a sequence of display processing according to the third embodiment.

FIG. 20 is a flow diagram indicating a sequence of display processing according to the third embodiment. In the following explanations, it is assumed that the electronic-paper display 31 is connected to the mobile phone 10b. The processing indicated in FIG. 20 is explained below step by step.

<Step S11> The input reception unit 150b receives an operational input by the user, and determines an address indicating a file to be acquired. The input reception unit 150b instructs the file acquisition unit 140 to acquire the file indicated by the determined address. Thereafter, the input reception unit 150b informs the display control unit 160b of the file name.

<Step S12> The expansion unit 161 acquires from the file storing unit 120 the file corresponding to the file name of which the display control unit 160b is informed by the input reception unit 150b. In addition, the expansion unit 161 acquires from the display-area table 111 the display-area information for the electronic-paper display 31, and produces screen data of the entire content item of the acquired file by expanding the data of the content item contained in the acquired file so as to fit the entire screen data to the display area of the electronic-paper display 31.

<Step S13> The extraction unit 163 determines the range of the upper-left area by reference to the area identification table 112, and extracts from the screen data produced in step S12 a portion of the screen data in the determined range. Thereafter, the extraction unit 163 outputs the extracted portion of the screen data to the partial-area display unit 170. In addition, the position management unit 162 holds information on the range of the partial area determined by the extraction unit 163, as information on the range of the area currently displayed by the display unit 104.

<Step S14> The screen division unit 164 divides the screen data produced in step S12, into a plurality of portions to be displayed in a plurality of partial areas, by reference to the area identification table 112. Then, the screen division unit 164 adds area-indication data to the entire screen data in order to visualize the range of the partial area and the identifier.

<Step S15> The screen division unit 164 outputs the entire screen data obtained in step S14 to the entire-area display unit 180, so that the content item designated by the user is displayed on the electronic-paper display 31.

<Step S16> The input reception unit 150b determines whether or not an operational input by the user is detected. When yes is determined in step S16, the operation goes to step S17. When no is determined in step S16, the input reception unit 150b repeats the operation in step S16.

<Step S17> The input reception unit 150b determines whether or not the operational input by the user is made for termination of browsing of the content item. When yes is determined in step S17, the processing of FIG. 20 is completed. When no is determined in step S17, the operation goes to step S18.

<Step S18> The input reception unit 150b determines whether or not the operational input by the user is made for designation of a file. When yes is determined in step S18, the operation goes to step S11. When no is determined in step S18, the operation goes to step S19.

<Step S19> The input reception unit 150b determines whether or not the operational input by the user is a scroll operation of the screen of the display unit 104. The scroll operation of the screen of the display unit 104 is, for example, pressing of a scroll key on the keypad 105. When yes is determined in step S19, the operation goes to step S20. When no is determined in step S19, the operation goes to step S21.

<Step S20> While the scroll operation continues, the input reception unit 150b continuously informs the display control unit 160b of the direction of the scroll. The extraction unit 163 determines the range of the area to be displayed by the display unit 104 after the scroll, on the basis of the direction of the scroll (of which the display control unit 160b is informed by the input reception unit 150b) and the information on the range of the area currently displayed by the display unit 104 (which is managed by the position management unit 162). In addition, the extraction unit 163 extracts from the screen data produced in step S12 a portion of the screen data in the range determined as above, and outputs the extracted portion to the partial-area display unit 170. The position management unit 162 holds information on the range determined by the extraction unit 163 as the information on the range of the area currently displayed by the display unit 104. The processing for changing the range of the area currently displayed by the display unit 104 is repeatedly performed while the display control unit 160b is continuously informed by the input reception unit 150b of the direction of the scroll. Thereafter, the operation goes to step S16.

<Step S21> The input reception unit 150b determines whether or not the operational input by the user is input of an identifier. When yes is determined in step S21, the operation goes to step S22. When no is determined in step S21, the operation goes to step S16.

<Step S22> The input reception unit 150b informs the display control unit 160b of the inputted identifier. The extraction unit 163 determines the range of the partial area corresponding to the identifier of which the display control unit 160b is informed by the input reception unit 150b, by reference to the area identification table 112.

<Step S23> The extraction unit 163 extracts from the screen data produced in step S12 a portion of the screen data corresponding to the range determined in step S22, and outputs the extracted portion to the partial-area display unit 170. The position management unit 162 holds information on the range of the partial area determined by the extraction unit 163 as the information on the range of the area currently displayed by the display unit 104.

<Step S23a> The input reception unit 150b determines whether or not an operational input by the user requesting magnified display is detected within a predetermined time of the detection of the input of the identifier. When yes is determined in step S23a, the operation goes to step S23b. When no is determined in step S23a, the input reception unit 150b repeats the operation in step S16.

<Step S23b> The input reception unit 150b informs the display control unit 160b of the detection of the operational input of the magnified display. Then, the magnification unit 166 acquires from the device-information storing unit 110 the display-area information for the electronic-paper display 31, performs processing for magnifying the image of the portion of the screen data extracted in step S13 so as to produce magnified screen data which fits the display area of the electronic-paper display 31, and outputs the magnified screen data to the entire-area display unit 180. Thereafter, the operation goes to step S16.

Thus, the operations of the mobile phone 100b according to the third embodiment are summarized as follows.

When the input reception unit 150b acquires the address of a file as above, the input reception unit 150b instructs the file acquisition unit 140 to acquire the file. Then, the file acquisition unit 140 acquires from the WWW server 200 the file indicated by the address. Next, the display control unit 160b produces screen data of the entire content item of the file acquired by the file acquisition unit 140, by expanding the data of the content item contained in the acquired file. In addition, the display control unit 160b makes the display unit 104 display a portion of the screen data corresponding to the upper-left area. Further, the display control unit 160b adds to the entire screen data the data indicating the range of the partial area and the identifier, and makes the electronic-paper display 31 display the entire screen data.

Thereafter, when the user inputs one of the identifiers at the sight of the screen of the electronic-paper display 31, the display control unit 160b determines the range of the partial area corresponding to the inputted identifier, and displays on the display unit 104 the screen data corresponding to the determined range. In addition, when the user performs an operation for magnified display, the display control unit 160b magnifies the image displayed on the display unit 104, and makes the electronic-paper display 31 display the magnified image. Further, when the user performs a scroll operation, the display control unit 160b changes the range of the area displayed on the display unit 104.

FIG. 21 is a diagram illustrating an exemplary screen displayed on an electronic-paper display according to the third embodiment. When the user inputs the identifier "33" and performs an operation for magnified display while the screen 61 illustrated in FIG. 10 is displayed on the electronic-paper display 31, the screen 66 indicated in FIG. 21 appears on the electronic-paper display 31. That is, the screen 66 is the magnified image of the area displayed on the display unit 104 when the user inputs the identifier "33."

When the mobile phone according to the third embodiment as described above is used, it is possible to achieve similar advantages to the first embodiment. In addition, even when the user cannot read a character string displayed with small characters on the display unit 104, the user can easily recognize the character string by viewing the magnified image displayed on the electronic-paper display 31.

The first to third embodiments may be modified as follows.

(1) Although the mobile phone is used for controlling the information displayed on the electronic-paper display according to the first to third embodiments, other types of mobile terminals (e.g., PDAs (personal digital assistants) or laptop computers) may be used.

(2) Although the electronic-paper displays are used as the external display device according to the first to third embodiments, other types of display devices (e.g., liquid-crystal display devices or projector-type display devices) may be used.

(3) Although the area-identification information for use in division of the display area of the electronic-paper display is produced by the mobile phone according to the first to third embodiments, the area-identification information may be produced by the WWW server.

(4) Although the numbers are used as the identifiers according to the first to third embodiments, other types of characters (e.g., alphabetical characters or symbols) may be used.

(5) Although the frame is used for highlighting the partial area which is also displayed on the mobile phone according to the second embodiment, the partial area may be highlighted in other manners, for example, by changing the background color.

The processing functions of the mobile phones according to the first to third embodiments which are explained above are realized by the aforementioned computer (realized in each mobile phone). In this case, a program describing details of processing for realizing the functions which each mobile phone should have is provided. When the computer executes the program, the processing functions of the mobile phone can be realized on the computer.

The program describing the details of the processing can be stored in a recording medium which can be read by the computer. The recording medium may be a magnetic recording device, an optical disk, an optical magnetic recording medium, a semiconductor memory, or the like. The magnetic recording device may be a hard disk drive (HDD), a flexible disk (FD), a magnetic tape (MT), or the like. The optical disk may be a DVD (Digital Versatile Disk), a DVD-RAM (Random Access Memory), a CD-ROM (Compact Disk-Read Only Memory), a CD-R (Recordable)/RW (ReWritable), or the like. The optical magnetic recording medium may be an MO (Magneto-Optical Disk) or the like.

In order to put the program into the market, for example, it is possible to sell a portable recording medium such as a DVD or a CD-ROM in which the program is recorded. Alternatively, it is possible to store the program in a storage device belonging to a server computer, and transfer the program to another computer through a network.

The computer which executes the program stores the program in a storage device belonging to the computer, where the program is originally recorded in, for example, a portable recording medium, or is initially transferred from the server computer. The computer reads the program from the storage device, and performs processing in accordance with the program. Alternatively, the computer may directly read the program from the portable recording medium for performing processing in accordance with the program. Further alternatively, the computer can sequentially execute processing in accordance with each portion of the program every time the portion of the program is transferred from the server computer.

As explained above, in the mobile terminal using the display control program according to the present invention, the display area of the external display device is divided into a plurality of partial areas each corresponding to the display area of the built-in display of the mobile terminal, and identifiers are assigned to the plurality of partial areas, respectively. When one of the identifiers is inputted, screen data in the range of the partial area corresponding to the inputted identifier is displayed on the built-in display. Therefore, the user can make the mobile phone instantly display the screen data including an item to be operated, on the built-in display, without scrolling the screen. In addition, the user can thereafter perform operation of the mobile terminal while viewing the screen of the built-in display, so that the operation errors can be positively reduced.

The foregoing is considered as illustrative only of the principle of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

In particular, it is possible to arbitrarily combine two or more of the features of the first to third embodiments of the present invention explained before.

What is claimed is:

1. A non-transitory computer-readable medium storing a display control program to be executed by a computer realized in a mobile terminal for controlling information displayed on a built-in display built in the mobile terminal and an external display device which can be connected to the mobile terminal through a connection unit built in the mobile terminal and has a first display area greater than a second display area which the built-in display has, where when said display control program is executed by the computer, said display control program causes the mobile terminal to perform a method comprising:

acquiring a content item to be displayed, and producing screen data corresponding to the first display area by reference to an area-information storing unit which stores information on the first display area of the external display device and the second display area of the built-in display;

dividing said screen data into a plurality of portions to be displayed in a plurality of partial areas of said first display area each corresponding to the second display area, by reference to said area-information storing unit, adding area-display data to the screen data, and displaying the screen data on said external display device, where the area-display data indicates a correspondence between an extent of each of said plurality of partial areas and an identifier for identifying said each of the plurality of partial areas; and extracting from said screen data one of said plurality of portions of the screen data for one of said plurality of partial areas corresponding to an identifier, and displaying the one of said plurality of portions of the screen data on said built-in display, when the identifier is received through an input unit which is built in said mobile terminal.

2. The non-transitory computer-readable medium according to claim 1, wherein said identifier for identifying said each of the plurality of partial areas is constituted by a first code indicating a position, along a horizontal direction, of said each of the plurality of partial areas in said first display area of said external display device and a second code indicating a position, along a vertical direction, of said each of the plurality of partial areas in the first display area of the external display device, and said area-display data added to said screen data is constituted by first data for displaying codes which indicate positions, along the horizontal direction, of the plurality of partial areas and second data for displaying codes which indicate positions, along the vertical direction, of the plurality of partial areas.

3. The non-transitory computer-readable medium according to claim 1, wherein said identifier for identifying said each of the plurality of partial areas is constituted by a first code indicating a position, along a horizontal direction, of said each of the plurality of partial areas in said first display area of said external display device and a second code indicating a position, along a vertical direction, of said each of the plurality of partial areas in the first display area of the external display device, and said area-display data added to said screen data is data for displaying lines which indicate limits of each of the plurality of partial areas and displaying inside the limits said identifier for identifying said each of the plurality of partial areas.

4. The non-transitory computer-readable medium according to claim 1, wherein said input unit has a plurality of input keys which are arrayed in an arrangement and to which a plurality of codes are respectively assigned, and assigns the plurality of codes to said plurality of partial areas as identifiers in correspondence with the arrangement of the plurality of input keys.

5. The non-transitory computer-readable medium according to claim 1, wherein when displaying a portion of the screen data on said built-in display, said mobile terminal adds to said screen data highlighted-display data for highlighting a portion of an image displayed on the external display device corresponding to said portion displayed on the built-in display, and displays the screen data on the external display device.

6. The non-transitory computer-readable medium according to claim 5, wherein while said input unit receives input of a scroll instruction which instructs to scroll an image displayed on the built-in display, said mobile terminal continuously updates the image displayed on the built-in display, by using the screen data, and said mobile terminal updates the highlighted portion of the image displayed on the external display device, with the image which is displayed on the built-in display and is continuously updated, at predetermined time intervals.

7. The non-transitory computer-readable medium according to claim 1, wherein said method further comprises producing magnified screen data by performing processing for magnifying an image of said one of the plurality of portions of the screen data displayed on the built-in display, and displaying an image of the magnified screen data on said external display device.

8. The non-transitory computer-readable medium according to claim 1, wherein said area-information storing unit stores information on a third display area of each of a plurality of external display devices which can be connected to said mobile terminal through said connection unit, and said mobile terminal determines one of the plurality of external display devices which is connected to the mobile terminal through the connection unit, and produces screen data corresponding to the third display area of the one of the plurality of external display devices.

9. A mobile terminal comprising:
an input unit which receives input of information into said mobile terminal;
a built-in display which is built in said mobile terminal and has a second display area;
a connection unit which is built in said mobile terminal and through which the mobile terminal can be connected to an external display device having a first display area greater than the second display area;
an area-information storing unit which stores information on said first display area of the external display device and said second display area of the built-in display;
a screen-data production unit which acquires a content item to be displayed, and produces screen data corresponding to the first display area of the external display device by reference to said area-information storing unit;
an entire-image display unit which divides said screen data produced by said screen-data production unit, into a plurality of portions to be displayed in a plurality of partial areas of said first display area each corresponding to the second display area, by reference to said area-information storing unit, adds area-display data to the screen data, and displays the screen data on said external display device, where the area-display data indicates a correspondence between an extent of each of said plurality of partial areas and an identifier for identifying said each of the plurality of partial areas; and
a partial-image display unit which extracts from said screen data produced by said screen-data production unit one of said plurality of portions of the screen data for one of said plurality of partial areas corresponding to an identifier, and displays the one of said plurality of portions of the screen data on said built-in display, when the identifier is received through said input unit.

10. The mobile terminal according to claim 9, wherein said identifier for identifying said each of the plurality of partial areas is constituted by a first code indicating a position, along a horizontal direction, of said each of the plurality of partial areas in said first display area of said external display device and a second code indicating a position, along a vertical direction, of said each of the plurality of partial areas in the first display area of the external display device, and said area-display data added to said screen data by said entire-image display unit is constituted by first data for displaying codes which indicate positions, along the horizontal direction, of the plurality of partial areas and second data for displaying codes which indicate positions, along the vertical direction, of the plurality of partial areas.

11. The mobile terminal according to claim 9, wherein said identifier for identifying said each of the plurality of partial areas is constituted by a first code indicating a position, along a horizontal direction, of said each of the plurality of partial areas in said first display area of said external display device and a second code indicating a position, along a vertical direction, of said each of the plurality of partial areas in the first display area of the external display device, and said area-display data added to said screen data by said entire-image display unit is data for displaying lines which indicate limits of each of the plurality of partial areas and displaying inside the limits said identifier for identifying said each of the plurality of partial areas.

12. The mobile terminal according to claim 9, wherein said input unit has a plurality of input keys which are arrayed in an arrangement and to which a plurality of codes are respectively assigned, and said entire-image display unit assigns the plurality of codes to said plurality of partial areas as identifiers in correspondence with the arrangement of the plurality of input keys.

13. The mobile terminal according to claim 9, wherein when said partial-image display unit displays a portion of the screen data on said built-in display, said entire-image display unit adds to said screen data highlighted-display data for highlighting a portion of an image displayed on the external display device corresponding to said portion displayed on the built-in display, and displays the screen data on the external display device.

14. The mobile terminal according to claim 13, wherein while said input unit receives input of a scroll instruction which instructs to scroll an image displayed on the built-in display, said entire-image display unit continuously updates the image displayed on the built-in display, by using the screen data produced by the screen-data production unit, and said entire-image display unit updates the highlighted portion of the image displayed on the external display device, with the image which is displayed on the built-in display and is continuously updated, at predetermined time intervals.

15. The mobile terminal according to claim 9, further comprising a magnification unit which produces magnified screen data by performing processing for magnifying an image of said one of the plurality of portions of the screen data displayed on the built-in display, and displays an image of the magnified screen data on said external display device.

16. The mobile terminal according to claim 9, wherein said area-information storing unit stores information on a third display area of each of a plurality of external display devices which can be connected to said mobile terminal through said connection unit, and said screen-data production unit determines one of the plurality of external display devices which is connected to the mobile terminal through the connection unit, and produces screen data corresponding to the third display area of the one of the plurality of external display devices.

17. A non-transitory computer-readable medium storing a display control program to be executed by a computer realized in a mobile terminal for controlling information displayed on a display of the mobile terminal and a display device separate from and interfacing with the mobile terminal,
wherein the separate display device has a first display area greater than a second display area of the mobile terminal display, and wherein, when said display control program is executed by the computer, said display control program causes the mobile terminal to perform a method comprising:

acquiring a content item to be displayed, and producing screen data corresponding to the first display area by reference to an area-information storing unit which stores information on the first display area of the separate display device and the second display area of the mobile terminal display;

dividing said screen data into a plurality of portions to be displayed in a plurality of partial areas of said first display area each corresponding to the second display area, by reference to said area-information storing unit, adding area-display data to the screen data, and displaying the screen data on said separate display device, where the area-display data indicates a correspondence between an extent of each of said plurality of partial areas and an identifier for identifying said each of the plurality of partial areas; and extracting from said screen data one of said plurality of portions of the screen data for one of said plurality of partial areas corresponding to an identifier, and displaying the one of said plurality of portions of the screen data on said mobile terminal display, when the identifier is received through an input unit of said mobile terminal.

18. A mobile terminal comprising:

an input unit which receives input of information into said mobile terminal;

a display of the mobile terminal which has a second display area;

an interface which interfaces with a display device separate from the mobile terminal, the separate display device having a first display area greater than the second display area;

an area-information storing unit which stores information on said first display area of the separate display device and said second display area of the mobile terminal display;

a screen-data production unit which acquires a content item to be displayed, and produces screen data corresponding to the first display area of the separate display device by reference to said area-information storing unit;

an entire-image display unit which divides said screen data produced by said screen-data production unit, into a plurality of portions to be displayed in a plurality of partial areas of said first display area each corresponding to the second display area, by reference to said area-information storing unit, adds area-display data to the screen data, and displays the screen data on said separate display device, where the area-display data indicates a correspondence between an extent of each of said plurality of partial areas and an identifier for identifying said each of the plurality of partial areas; and a partial-image display unit which extracts from said screen data produced by said screen-data production unit one of said plurality of portions of the screen data for one of said plurality of partial areas corresponding to an identifier, and displays the one of said plurality of portions of the screen data on said mobile terminal display, when the identifier is received through said input unit.

* * * * *